(12) United States Patent
Pallmann

(10) Patent No.: US 6,743,160 B2
(45) Date of Patent: Jun. 1, 2004

(54) METHOD, ARRANGEMENT, DEVICE AND MAGAZINE FOR AUTOMATIC CHANGING OF KNIFE UNITS OF A KNIFE RING OF A KNIFE RING SLICING DEVICE

(75) Inventor: Wilhelm Pallmann, Zweibrücken (DE)

(73) Assignee: Pallmann Maschinenfabrik GmbH & Co. KG, Zweibrucken (DE)

( * ) Notice: Subject to any disclaimer, the term of this patent is extended or adjusted under 35 U.S.C. 154(b) by 0 days.

(21) Appl. No.: 10/151,718

(22) Filed: May 18, 2002

(65) Prior Publication Data
US 2002/0173413 A1 Nov. 21, 2002

(30) Foreign Application Priority Data
May 21, 2001 (DE) .......................................... 101 25 923

(51) Int. Cl.$^7$ ................................................. B23Q 3/57
(52) U.S. Cl. ............................... 483/1; 483/31; 483/57; 29/426.1; 144/172; 144/373
(58) Field of Search ........................... 483/1; 29/426.1; 144/172, 373

(56) References Cited

U.S. PATENT DOCUMENTS

| | | | |
|---|---|---|---|
| 4,660,777 A | * | 4/1987 | Schaefer et al. ............... 241/88 |
| 5,217,424 A | * | 6/1993 | Pallmann ........................ 483/1 |
| 5,313,696 A | | 5/1994 | Dunne et al. |
| 5,417,637 A | * | 5/1995 | Ninomiya ....................... 483/1 |
| 5,725,464 A | * | 3/1998 | Pallmann ........................ 483/1 |

FOREIGN PATENT DOCUMENTS

| | | |
|---|---|---|
| DE | 1926777 | 11/1970 |
| DE | 3309517 | 3/1984 |
| DE | 4114840 | 1/1995 |
| DE | 199 21 383 A1 | 11/2000 |

* cited by examiner

Primary Examiner—A. L. Wellington
Assistant Examiner—Dana Ross
(74) Attorney, Agent, or Firm—Friedrich Kueffner

(57) ABSTRACT

In a method and device for automatically exchanging knife units of a knife ring slicing device, the knife changing magazine is moved relative to the knife ring into a knife changing position in which the knife receptacles of the knife changing magazine are axially aligned with the knife receptacles of the knife ring. The worn knives of the knife ring are moved axially into empty knife receptacles of the knife changing magazine. A relative movement between the knife changing magazine and the knife ring is carried out until the knife changing magazine and the knife ring are again in a knife changing position in which the knife receptacles with resharpened knife units are aligned with the knife receptacles in the knife ring. The resharpened knife units are introduced in the opposite axial direction into the knife receptacles of the knife ring from which the worn knife units had been removed.

12 Claims, 17 Drawing Sheets

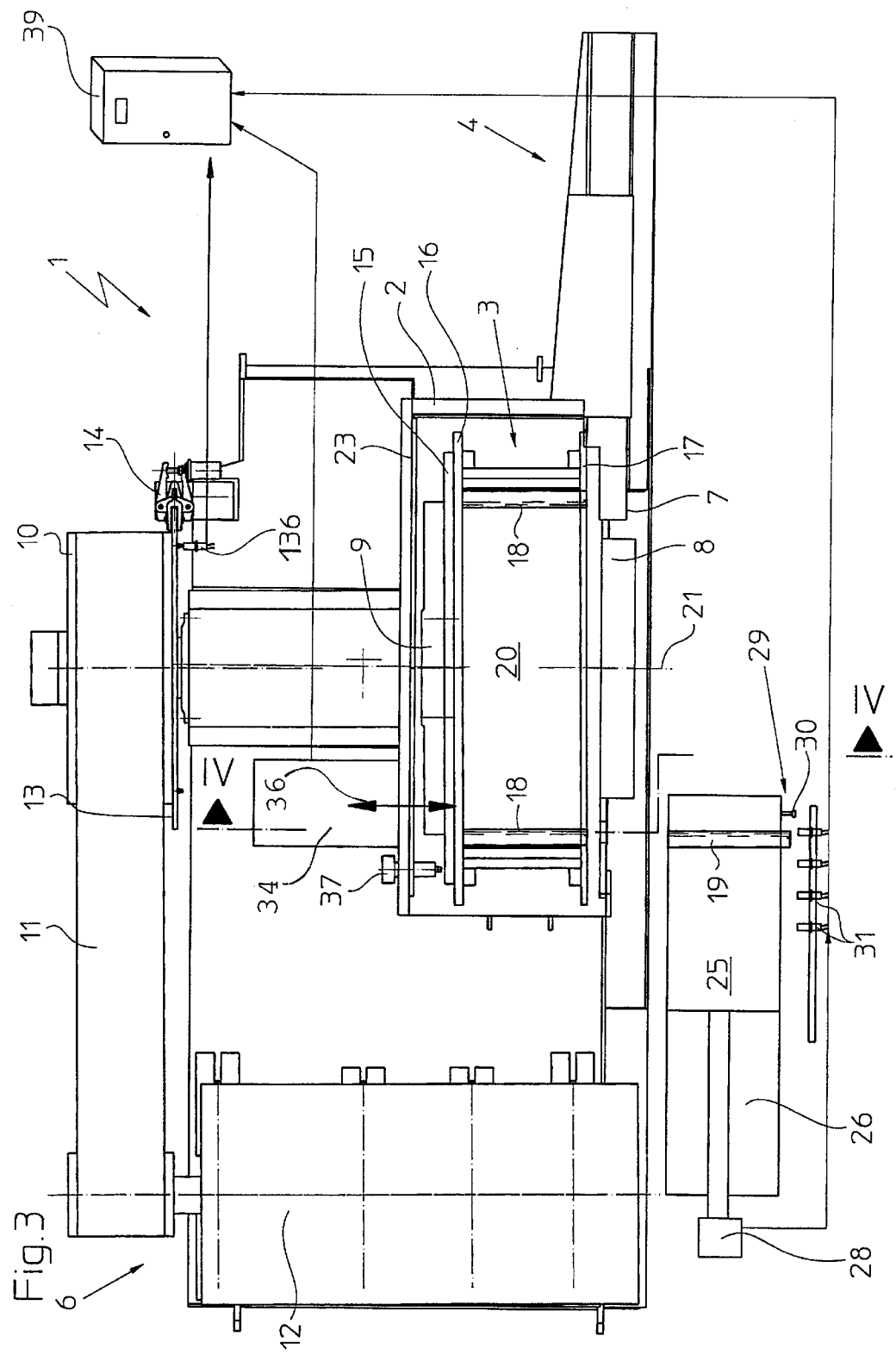

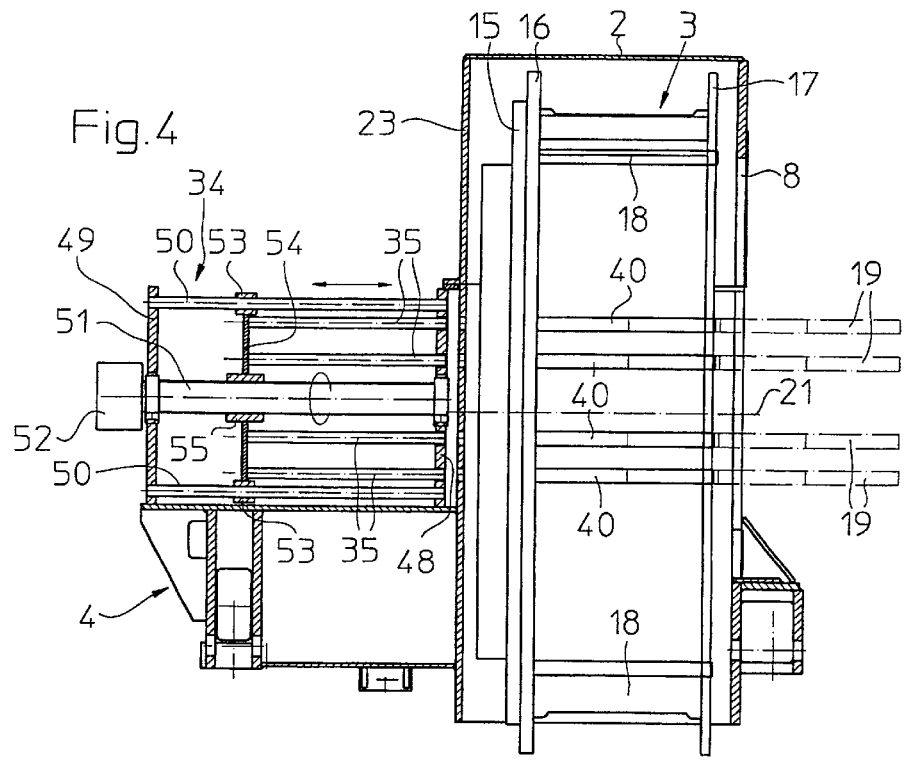
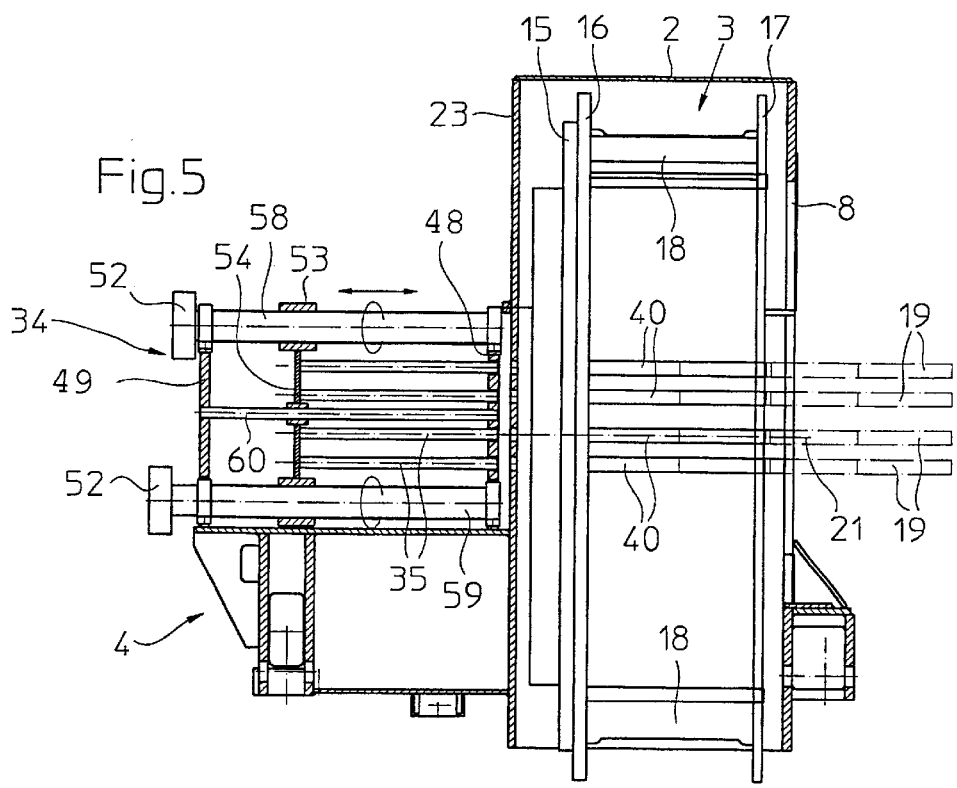

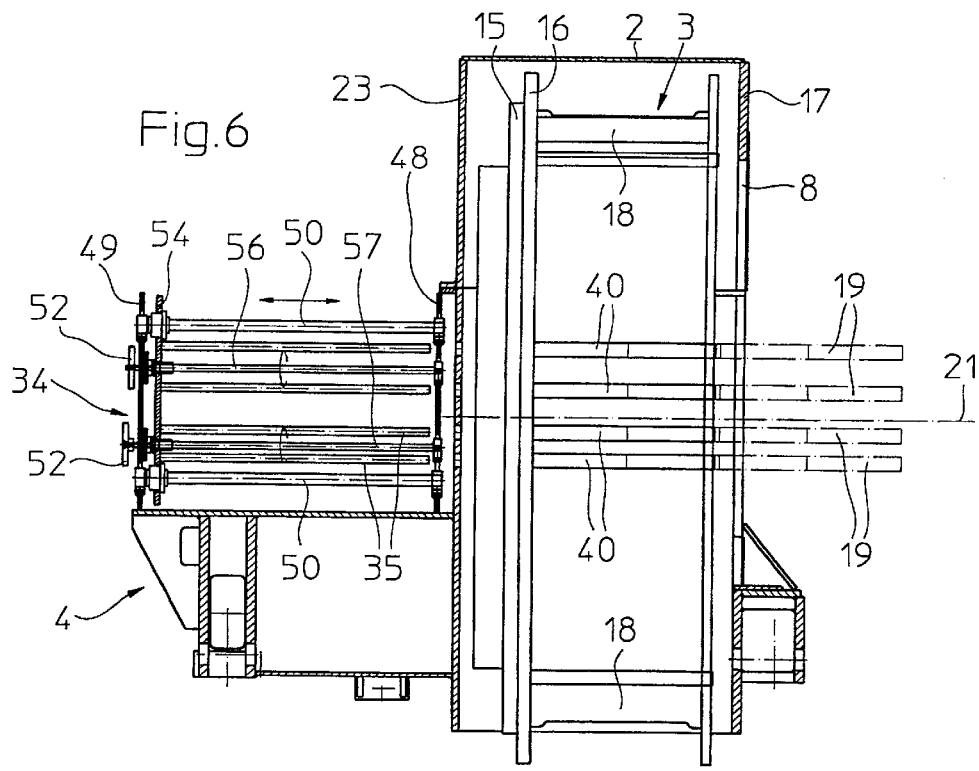
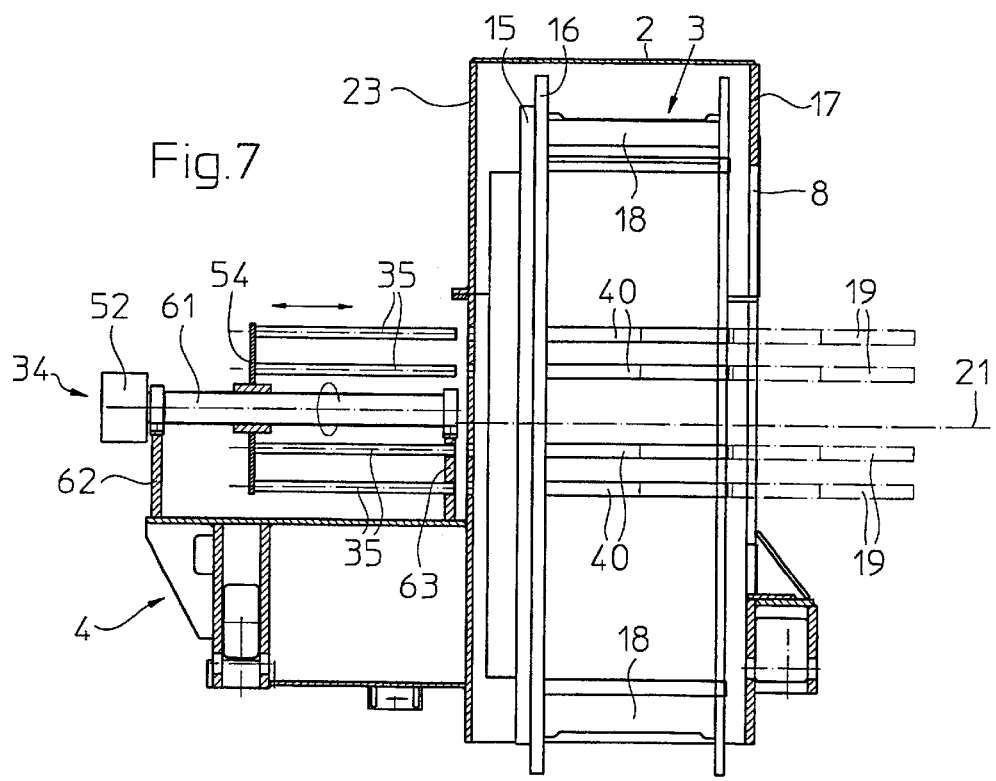

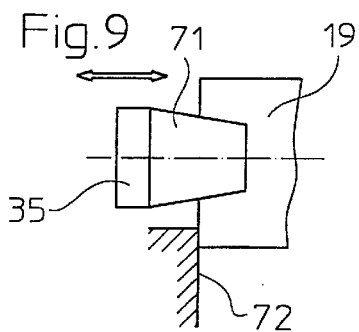
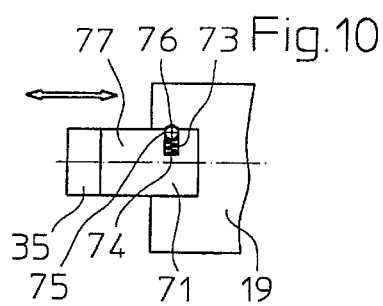
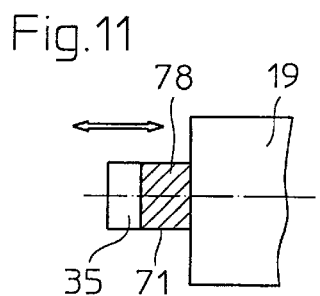
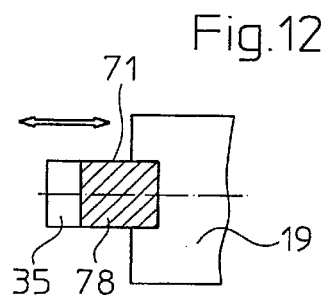
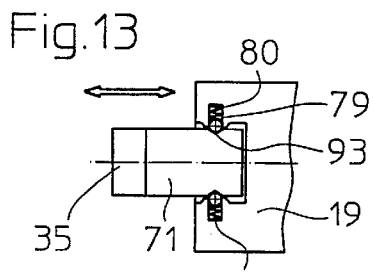
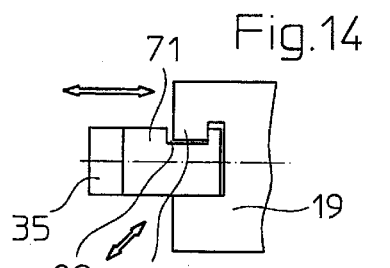
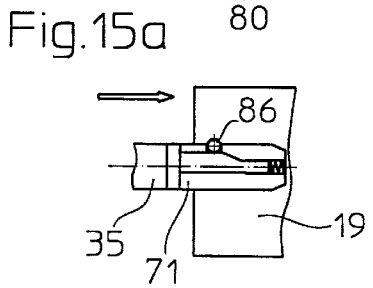
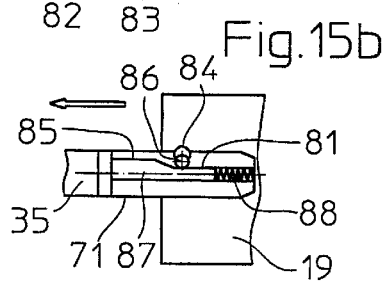
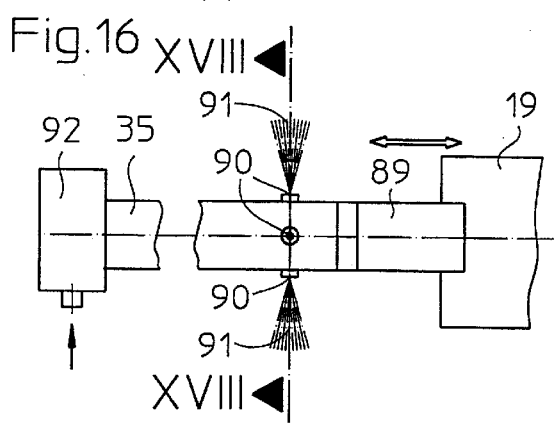
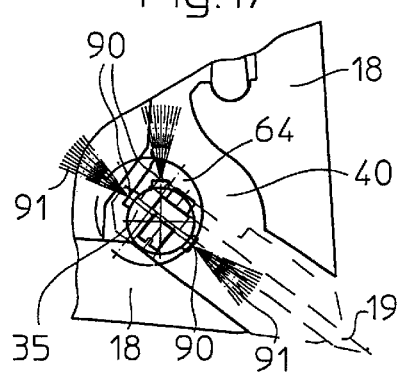

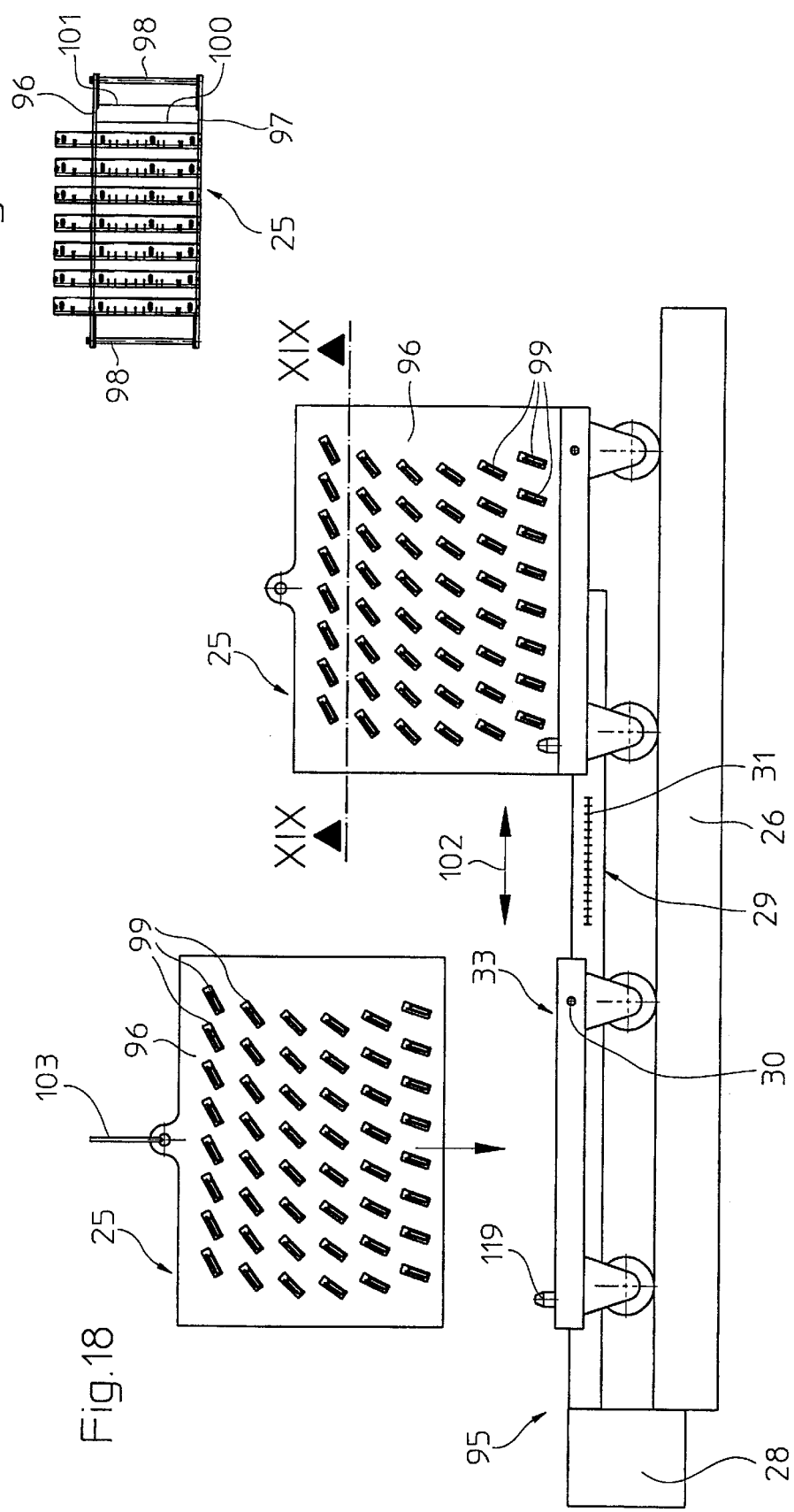

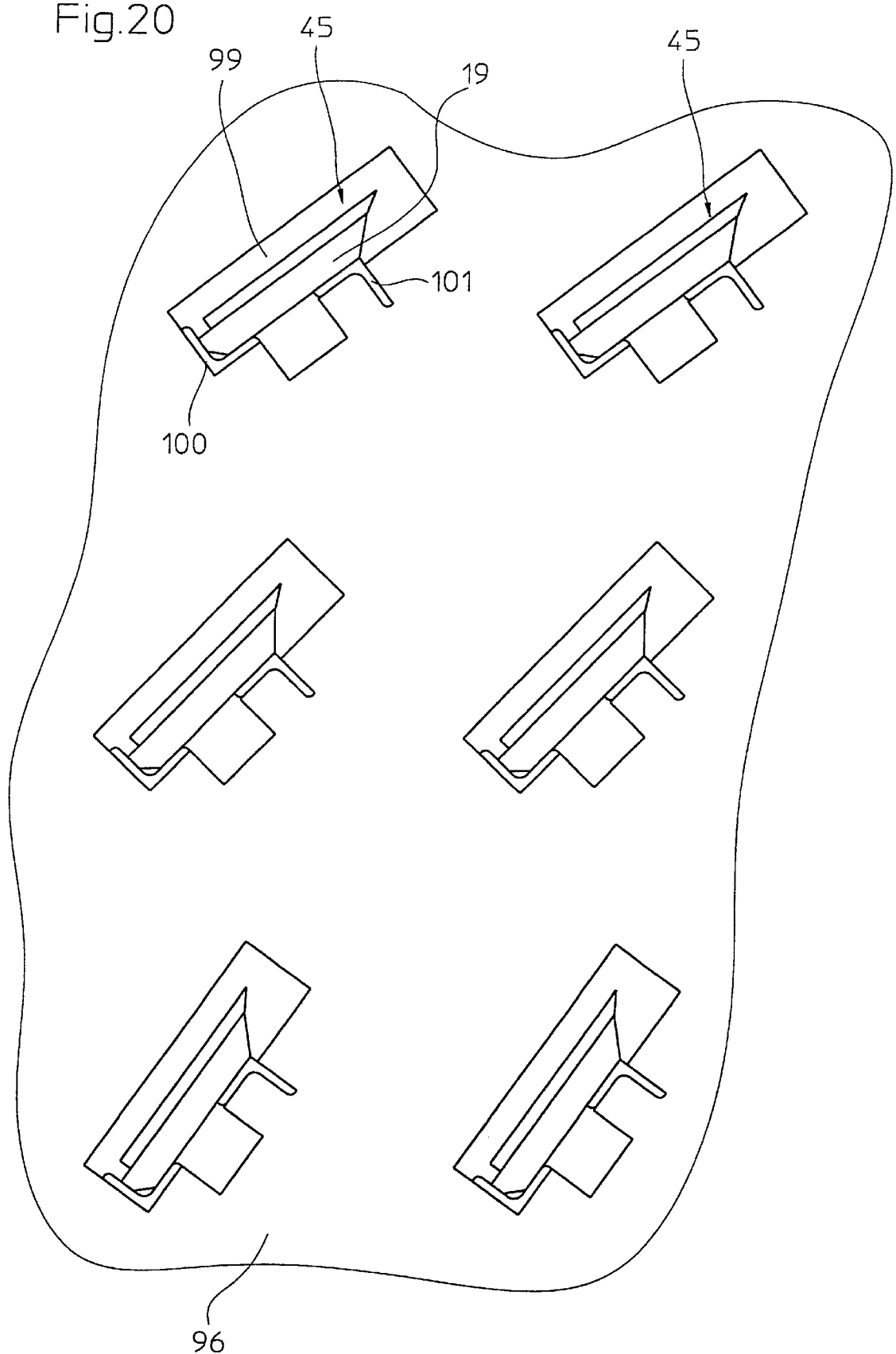

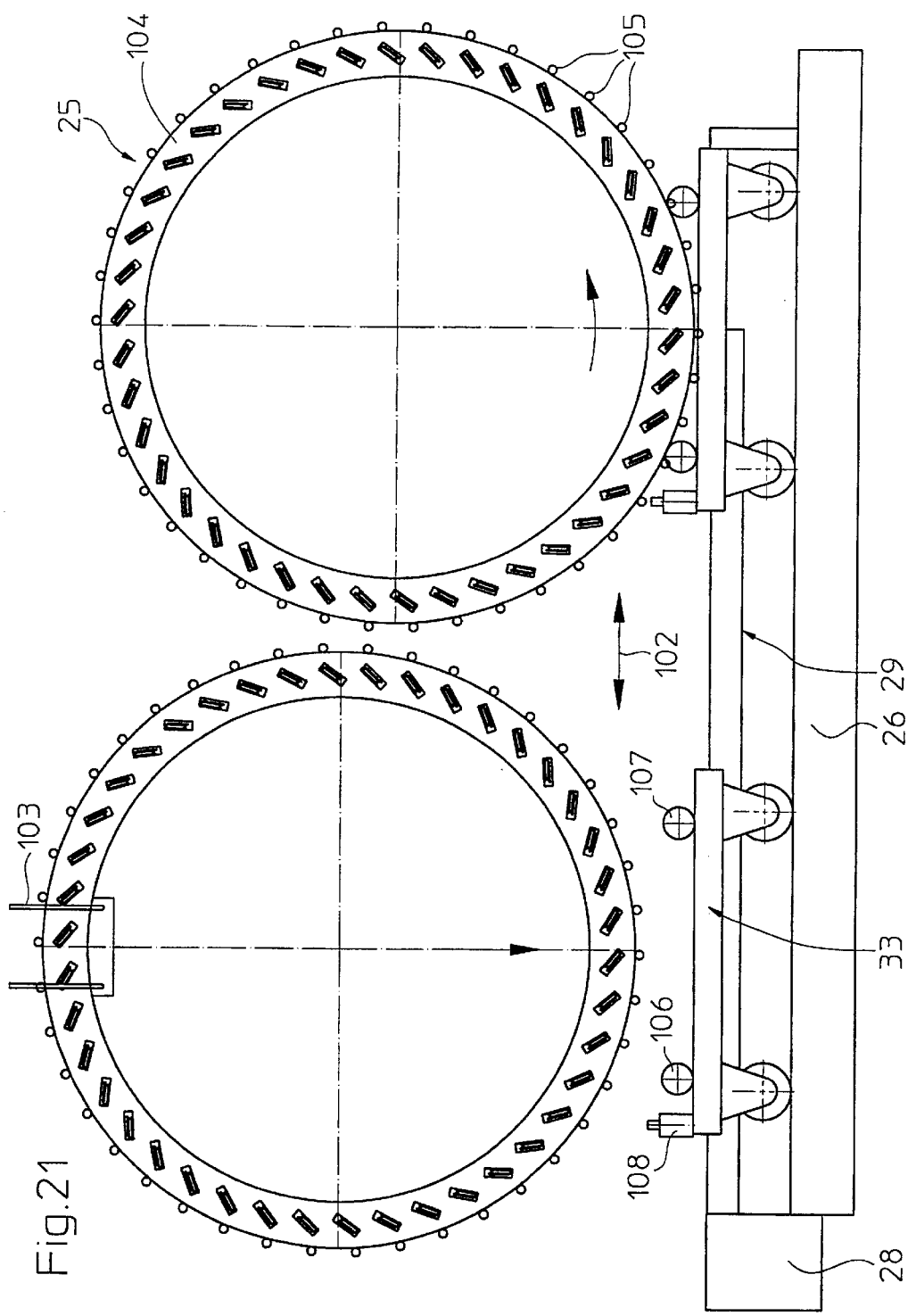

METHOD, ARRANGEMENT, DEVICE AND MAGAZINE FOR AUTOMATIC CHANGING OF KNIFE UNITS OF A KNIFE RING OF A KNIFE RING SLICING DEVICE

BACKGROUND OF THE INVENTION

1. Field of the Invention

The invention relates to a method, an arrangement, and a device for automatically changing knife units of a knife ring of a knife ring slicing device, wherein a knife changing magazine provided with resharpened knife units is moved into a defined knife changing position relative to the knife ring in which at least some of the knife receptacles in the knife changing magazine are axially aligned with at least some of the knife receptacles in the knife ring. In particular, the invention relates also to a device for comminuting material especially in the form of a knife ring slicing device, comprising a tool ring, which has uniformly distributed about its circumference tool receptacle for the comminution tools, and comprising a unit for pushing out the comminution tools, arranged on the periphery of the device, wherein the unit for pushing the comminution tools comprises several pushing elements which are axially aligned with the comminution tools to be pushed out and are advanced and retracted axially into and out of the tool receiving units of the tool ring by means of an advancing drive. The invention furthermore relates to a knife changing magazine for automatically changing the knife units of a knife ring, wherein the knife changing magazine has areas with receptacles for the knife units of a knife group to be exchanged at once.

2. Description of the Related Art

For producing wood strands as the starting material for manufacturing board-shaped structural components, slicing machines are known whose comminution tools are arranged in a stationary or rotating knife ring and operate relative to a stationary or rotating abutment. The strands produced in this way pass in the radial direction through the knife ring. The quality of the final product is greatly affected by the quality of the strands used as the starting material. The strands should have cut surfaces as smooth as possible and also identical dimensions. In order to ensure a constantly high quality of the strands, it must be ensured that the comminution tools always have sharp cutting edges in order to achieve comminution by means of cutting and, to a lesser degree, by squeezing or breaking or grinding. Sharp comminution tools have also the advantageous side effect of a reduced electric energy consumption of the comminution machine.

During operation of a comminution machine, the comminution tools are subjected to natural wear. The degree of wear depends on various factors, for example, the type of wood and moisture contents of the wood of the starting materials as well as the advancing speed and circumferential speed of the cutting tools as well as on constructive parameters such as the cutting angle and the material properties of the comminution tools. The strongest wear effect can be observed on the cutting edges of the comminution tools which become more and more blunt with increasing service life so that during the generation of wood strands a smooth cut can no longer be ensured. This causes at the same time a decrease of the strand quality, an increase of the undesirable proportion of fine particles in the wood strands and, as a result of this, an increase of the required amount of bonding agent as well as an increase of energy consumption of the slicing machine.

In order to avoid these disadvantages, it is required to perform a knife exchange in regular intervals wherein the worn or spent comminution tools are replaced by resharpened ones. Under regular conditions such a knife exchange is carried out in time intervals of three to eight hours. Since all comminution tools of a knife ring must be exchanged in such a knife exchange operation, this requires a considerable temporal expenditure which causes long downtimes of a comminution machine. In connection with known methods and devices for exchanging the comminution tools, which are performed manually or semi-automatically, a knife exchange takes approximately 20 to 40 minutes. For an average service life of the comminution tools of four hours, this causes a production loss of three hours per day. Accordingly, the resulting product loss relative to a nominal strand production output makes it necessary to design the comminution device for higher comminution output in order to ensure the continuous further processing of the produced strands in the subsequent processing steps. This entails providing larger bunker capacities as a buffer for bridging the production loss caused by the knife exchange.

In order to circumvent these disadvantages, attempts have been made to shorten the duration for a knife exchange. From German patent application 199 21 383 A1 and U.S. Pat. No. 5,313,696, a method and a device for changing the comminution tools of comminution devices are known in which the complete knife ring of the comminution device is removed and replaced by a second knife ring furnished with resharpened comminution pools.

For removing the worn or spent knife ring according to German patent application 199 21 383 A1, a tool exchange carriage is used which is moved in front of the end face of the comminution device and provides together with attachments of the comminution device a path on which the knife ring, detached from its fastening means, can be pulled axially out of the housing of the comminution device onto the carriage.

For demounting the knife ring, U.S. Pat. No. 5,313,696 suggests to arrange it, including its attachment components, its positioning components, and its drive components, on a support whose path, extending parallel to the axis of rotation, enables an axial movement of the complete comminution unit before the knife ring is removed by means of a crane and replaced by a newly furnished knife ring.

The disadvantage of these solutions is that for a knife exchange the complete knife ring must be exchanged. In addition to requiring an additional knife ring, this results in a great technical expenditure, for example, for a tool change carriage and the elements connected thereto for coupling the carriage or for a support for axially pushing out the complete comminution unit. The labor expenditure for mounting and demounting the knife ring must be added to the time required for exchanging the knives of the knife ring so that this solution is not satisfactory with respect to economic efficiency.

How the actual change of the comminution tools, i.e., their mounting in and demounting from the knife ring is carried out, is not disclosed in these prior art references.

Suggestions in this respect can be taken from German patent 41 14 840 C2 describing a method and a device for exchanging the knives of a knife ring wherein here the knife ring must first be demounted from the comminution device and must be placed into a knife changing device. In this knife changing device an automatic knife exchange takes place by means of a magazine in which the knives arranged in the knife ring, after having been released from their fastening means, are first pushed out individually and sequentially from the knife ring and are then transported on a carriage axially to the magazine where they are placed in the radial direction into the magazine.

In comparison to the prior art known at the time the invention according to 41 14 840 C2 was made, this method and this device provided a significant technological advance.

However, this type of knife exchange is also possible only with the knife rings being removed from the comminution device wherein the individual knives are successively exchanged. The simultaneous exchange of several knives is not possible with this method and this device.

From German patent 33 09 517 C1 a knife exchange is known which is possible with the knife ring mounted in the comminution device. For this purpose, magazines are arranged at the end face of the knife ring which are in the form of a roll for steel strip knives or a cassette for disposable (single-use) knives, wherein the knives are moved by means of an axially acting advancing device into the knife ring. These solutions are said to enable a knife exchange even during operation of a strand-producing chopping device.

A similar approach is also known from German published patent application 19 26 777. Here a magazine having dimensions matching those of the knife ring is placed axially onto the knife ring. After detachment of the fastening means of the knives in the knife ring they are pushed out simultaneously with the action of pushing in the resharpened knives on the other side of the knife ring.

The two last mentioned methods for exchanging the spent knives of the knife ring has the disadvantage that at the front side as well as at the backside of the knife ring a high technical expenditure must be provided in order to push on one side the resharpened knives into the knife ring and to remove at the opposite side the spent knives from the knife ring.

SUMMARY OF THE INVENTION

It is an object of the present invention to provide a method and a device which enable a completely automatic knife exchange which can be performed with minimal technical expenditure within an extremely short period of time.

In accordance with the present invention, this is achieved in regard to the method in that the spent knife units, after detachment of their fastening means in the knife ring, are pushed or pulled in the axial direction out of the knife ring into an empty compartment within the knife changing magazine and, subsequently, a relative movement between the knife changing magazine and the knife ring is carried out until a knife changing position has been reached in which the knife units which have been resharpened are aligned with the knife receptacles in the knife ring and the resharpened knife units are moved from the knife changing magazine in the opposite direction into the knife ring.

In regard to the arrangement this is achieved according to the invention in that a unit for releasing and fastening the knife units in the knife ring is provided, in that a pushing unit is provided which is arranged axially opposite the end faces of the knife ring and which is suitable to transport at least one knife unit positioned in the knife exchange position axially out of the knife ring into the knife changing magazine, in that at least one unit for performing a relative movement between the knife changing magazine and the knife ring is provided, and in that an insertion unit is provided which is suitable to axially push or pull at least one knife unit out of the knife changing magazine into the knife ring.

In regard to the device for comminuting, this object is achieved in that the pushing elements are arranged on a transverse beam onto which the advancing drive acts.

In regard to the knife changing magazine, this is achieved in that the knife changing magazine has at least one more receiving area than knife groups to be exchanged The present invention is based on the principal idea that a completely automatic exchange of the knife units of a knife ring is to be enabled without requiring any human intervention. When carrying out the method, the detection, governing, and control of the individual operating states of the method are realized by a programmable automatic sequence control.

When personnel is still to be used to some extent, the knife exchange can also be performed semi-automatically. In the semi-automatic variant, the knife units are pushed out of the knife ring only partially and are then removed by hand from the knife ring and replaced by resharpened knives. This variant of the invention is suitable in connection with the device according to the invention having the pushing elements arranged on a transverse beam onto which the advancing drive acts.

The automated knife exchange makes the operator of the comminution machines according to the invention independent of the possible shortcomings of the employed personnel; often it is these shortcomings of the personnel that cause damage to the slicing machines or lower quality of the wood strands. Moreover, the knife exchange in the past required great physical expenditure and presented a great risk of injuries as a result of the great weight and the unwieldy configuration of the knife units as well as the sharp cutting edges of the knives. The automation which can be achieved by means of the invention eliminates a source of injury for the good and the health of the operating personnel.

The reduction of the downtime of the comminution machines when employing the inventive method is of economical and thus imminent importance for the operator of comminution machines. Since the knives of comminution machines must be exchanged four times, or even more frequently, each day, the time which is saved for each knife exchange by means of the present invention over the course of time results in a significant advantage with regard to costs.

The exchange of the knife units according to the invention can be realized for the mounted as well as demounted knife ring; this provides great flexibility. The method according to the invention and the device according to the invention enable an exchange of groups of knife units wherein the number of knife units in a group comprises in the extreme situation at least one knife unit and a maximum of all knife units of a knife ring. Preferred are however knife groups which contain one fourth up to one sixteenth of all knife units of a knife ring so that with a cycle time between four and 16 a complete exchange of the knife units can be performed. In this way, an optimum of time savings and a minimum of constructive expenditure, enabling a compact design of the comminution machines, are realized.

The method and the device according to the invention require only a single knife changing magazine so that the constructive expenditure is limited to a minimum. This is enabled in that simultaneously the knife changing magazine is used as a storage container for the knife units which have been resharpened for the knife exchange and, on the other hand, for receiving the worn or spent knives from the knife ring so that the manufacturing costs relative to other devices are significantly reduced.

Since the knife exchange substantially is carried out only at the forward end face of a knife ring and substantially all components for performing the knife exchange are arranged here, this configuration also enables an extremely compact and thus space-saving design. With respect to servicing and repairs, this has the advantage of improved accessibility of the device according to the invention.

For performing a relative movement between the knife ring and the knife changing magazine after the worn knife units have been pushed out from the knife ring, a movement of the knife changing magazines is preferred according to the invention even though an adjustment of the knife ring would be possible. This preference is based on the smaller mass of the knife changing magazine which therefore enables with a reduced force expenditure a quicker realization of the relative movement. For realizing the relative movement, axial movements or pivot movements of the knife changing magazines relative to the knife ring are basically also possible. According to the invention, a horizontal or vertical displacement possibility is preferred because such a configuration requires the smallest space and, in this way, the compact configuration of the device of according to the invention can be further improved. A vertically performed relative movement provides, primarily in combination with a two-level construction of the comminution machine, the advantage that the knife exchange magazine with spent knife units during the course of relative movement can be advanced, for example, to a sharpening device arranged underneath the comminution machine.

When the exchange of the knife units is not carried out at once but in a cycled fashion, after each exchange of a knife group a further relative movement between knife changing magazine and knife ring must occur in order to move a section of the knife ring to be furnished with resharpened knife units from the knife changing magazine into the exchange position so that the old knives of the knife ring can be received. In principle, this relative movement can also be performed by the knife changing magazine. However, it is advantageous to define a fictitious knife changing position into which the knife changing magazine as well as the knife ring are moved. While for the knife changing magazine, as described, a horizontal or vertical adjustment movement is suggested, the invention prefers in this connection a rotational movement of the knife ring. In this way, a decoupling, and thus simplification, of the movement sequence is realized which also has an effect in regard to a simplified configuration of the comminution device.

A preferred embodiment of the invention provides that the knife units during the steps of being pushed out and being inserted are guided additionally. This is known primarily in connection with devices in which the knife changing magazine is arranged at an axial spacing from the end face of the knife ring. By means of an additional guiding it is ensured that the knife units reach precisely the receptacles of the knife ring or of the knife changing magazine. The guide arrangement therefore contributes significantly to improving the operational safety.

The signal for the knife exchange can be realized as a function of time but also as a function of the quality of the produced wood strands. The invention prefers however an energy-dependent control of the knife exchange because, in this way, the special wear state of the knife units is taken into consideration.

The operation of a comminution device also entails that the fine material will deposit within the knife receptacles of the knife ring. Since the boundary surfaces of the receptacles are also reference surfaces for the resharpened knife units, which are adjusted relative to the reference surfaces with regard to their geometry in order to finally reach the nominal position, dirt deposits cause a falsification of the reference surfaces so that the resharpened knife units are mounted in the knife ring in a position which deviates from the nominal position. In order to prevent this, it is suggested according to the invention to perform a cleaning of the receptacles, and thus of the reference surfaces of the knife ring, between the steps of pushing the knife units out of the knife ring and inserting the resharpened knife units into the knife ring. The cleaning action can be realized mechanically by means of a slide which frees the reference surfaces from dirt deposits, for example, during insertion of and/or pushing out the knife units. A slide is suitable, in particular, for cleaning planar surfaces. Another possibility according to the invention is provided by generating a fluid flow in the receptacles of the knife ring. For this purpose, a nozzle can be arranged at the end of a receptacle where the end face is or can be introduced together with the pushing unit into the receptacles. In this way, even locations which are difficult to access can be cleaned.

A further possibility of cleaning of the receptacle of a knife ring according to the invention is the use of a milling brush which is used alone or in combination with the aforementioned measures.

In order to ensure that the knife units which have been resharpened are actually mounted in the nominal position within the knife ring after knife exchange, according to a special embodiment of the invention it is suggested to monitor by means of a measuring device the nominal position of the knife units within the knife ring. In this connection, the radial projecting length of the cutting edges of the knife units past the inner wall of the knife ring is monitored as well as the axial insertion depth of the knife units into the knife ring. Only when the control measurements indicate a proper position of the knife units, the exchange of the knife units can be continued. In this way, damage of the comminution machine is prevented which, for example, could result by a too large radial projecting length of the cutting edge into the comminution space. Particularly when carrying out a completely automated knife exchange, the realization of control measures is of great importance because monitoring by an operator, who is capable of recognizing severe mounting errors of the knife units with ease, is no longer possible. Ensuring mounting of the knife units in the nominal position by means of an additional control measurement significantly increases at the same time the quality of the produced wood strands.

The invention will be explained in the following with embodiments illustrated in the drawings in the form of a long-cut wood slicing device with rotating knife ring. It is understood that the invention is not limited to such comminution devices; devices are also included which have comparable comminution tools which are arranged in a tool ring and axially removed from or inserted into the tool ring. Screen milling elements or grinding track elements of mills are mentioned as an example in this context.

BRIEF DESCRIPTION OF THE DRAWING

In the drawing:

FIG. 3 shows a horizontal section along the section line III-III of the knife ring slicing device with knife changing unit as illustrated in FIG. 2;

FIG. 4 shows in partial cross-section a view of the knife ring slicing device illustrated in FIG. 3 in the area of the knife changing unit along the section line IV-IV, wherein a first embodiment of the knife changing unit is illustrated;

FIG. 5 shows in partial cross-section a view of the knife ring slicing device illustrated in FIG. 3 in the area of the knife changing unit along the section line IV-IV, wherein a second embodiment of the knife changing unit is illustrated;

FIG. 6 shows in partial cross-section a view of the knife ring slicing device illustrated in FIG. 3 in the area of the knife changing unit along the section line IV-IV, wherein a third embodiment of the knife changing unit is illustrated;

FIG. 7 shows in partial cross-section a view of the knife ring slicing device illustrated in FIG. 3 in the area of the knife changing unit along the section line IV-IV, wherein a fourth embodiment of the knife changing unit is illustrated;

FIG. 9 shows schematically a detail view of a first embodiment of the coupling between the pushing element of the knife changing unit and the knife unit;

FIG. 10 shows schematically a detail view of a second embodiment of the coupling between the pushing element of the knife changing unit and the knife unit;

FIG. 11 shows schematically a detail view of a third embodiment of the coupling between the pushing element of the knife changing unit and the knife unit;

FIG. 12 shows schematically a detail view of a fourth embodiment of the coupling between the pushing element of the knife changing unit and the knife unit;

FIG. 13 shows schematically a detail view of a fifth embodiment of the coupling between the pushing element of the knife changing unit and the knife unit;

FIG. 14 shows schematically a detail view of a sixth embodiment of the coupling between the pushing element of the knife changing unit and the knife unit;

FIGS. 15a and 15b show schematically a detail view of a seventh embodiment of the coupling between the pushing element of the knife changing unit and the knife unit in two different positions;

FIG. 16 shows a side view of the pushing element of the knife changing unit with integrated cleaning nozzles;

FIG. 17 shows a cross-section along the line XVII-XVII of the pushing element illustrated in FIG. 16;

FIG. 18 shows a view of a movable knife changing magazine including its drive;

FIG. 19 shows a horizontal section along the line XIX-XIX of the magazine illustrated in FIG. 18;

FIG. 20 shows a partial view of the knife changing magazine illustrated in FIG. 18 in the area of the knife receptacles;

FIG. 21 is a view of a further embodiment of the knife changing magazine;

DESCRIPTION OF THE PREFERRED EMBODIMENTS

Figure 1:
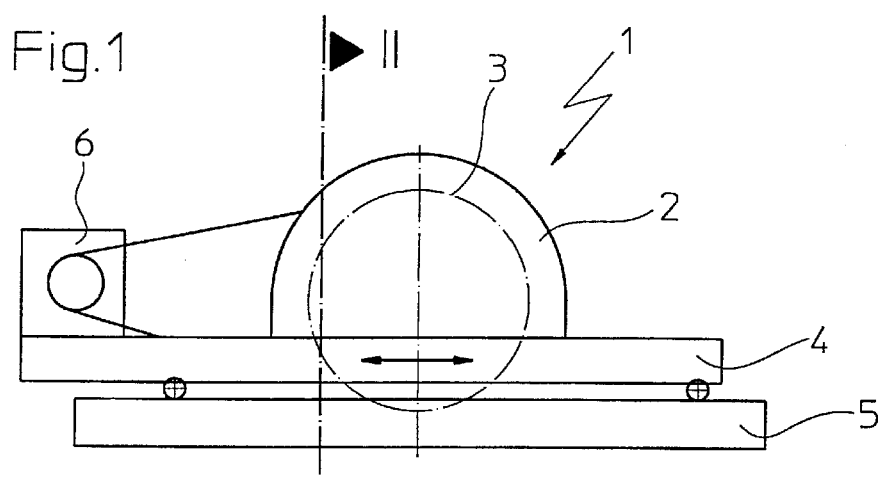
FIG. 1 shows a schematic view of a knife ring slicing device.

FIG. 1 shows in a schematic view a knife ring slicing device 1. The knife ring slicing device 1 has a knife ring 3 arranged within a machine housing 2 which is transversely movable on a base frame 4 of the machine across the stationary substructure 5 of the machine in the direction of the double arrow. The drive of the knife ring 2 is realized by a drive 6 also arranged on the basic frame 4 of the machine.

In FIG. 3 the configuration of the knife ring slicing device 1 is shown in more detail. Also shown is a knife changing unit 34, required for the knife exchange, in a simplified illustration. Illustrated is the transversely movable base frame 4 on wheels 24 to which the machine housing 2 is connected fixedly. The machine housing 2 has at its front side 7 a central circular opening 8. The back wall 23 of the housing 2 however is penetrated by a horizontally arranged drive shaft 9 which is freely rotatably supported on a self-aligning roller bearing. The end of the drive shaft 9 outside of the housing 2 supports a disk 10 having several grooves and connected by means of the drive belt 11 with an electric motor 12. A braking and indexing disc 13 is mounted on the multi-groove disk 10 like an annular flange which is correlated with a disc brake 14 of the housing 2. In immediate vicinity to the braking and indexing disc 13 an initiator 136 is arranged which transmits together with the braking and indexing disc 13 the respective position of the multi-groove disc and thus of the knife ring 3 to the programmed automatic sequence control 39. A knife ring locking device 37 arranged on the housing 2 is provided in order to secure a predetermined position of the knife ring 3 relative to the housing 2, as, for example, the knife changing position.

On the end of the drive shaft 9 positioned in the housing 2 a support disc 15 is seated coaxial to the drive shaft 9. The knife ring 3 is detachably fastened on the disc 15.

The knife ring 3 is comprised of a first annular disc 16 and a second concentric annular disc 17 which are connected to one another by knife carriers 18 which are uniformly distributed about the circumference and axially aligned and secured at a spacing to one another. The knife carriers 18 have axial knife receptacles 40, respectively, into which the knife units 19 are inserted and fastened. The knife units 19 in the present case are comprised of a slicing knife and a knife holding plate; however, in principle, they can also be comprised simply of the slicing knife itself.

In FIGS. 1 and 4 through 7, the knife receptacles 40 and knife units 19 are illustrated only in a simplify illustration wherein the knife units 19 shown in dash-dotted line are already pushed out of the knife receptacles 40.

The slicing chamber 20 is formed thus by the support disc 15 and the circular space surrounded by the knife ring 3 into which the material to be comminuted is introduced in the axial direction via the opening 8. By rotating the knife ring 3 about the axis of rotation 21 and a relative movement between the knife ring 3 and the material to be comminuted by transverse movement of the base frame 4 of the machine, the slicing operation is carried out wherein the comminuted material exits in the radial direction through the knife ring 3 and exits the knife ring slicing device 1 within the housing 2 through an opening 22 at the bottom side and is then transported away, for example, by a conveyor belt.

On the front side 7 of the knife ring slicing device 1 at the level of the axis of rotation 21 and axially opposite a portion of the annular disc 17, a knife changing magazine 25 is arranged which is movable on a stationary substructure 26 along the front side 7 the knife ring slicing device 1. The stationary substructure 26 for this purpose is provided at its upper side with two rails 27, a drive 28, as well as a travel measuring system 29, comprised of an index bolt 40 and initiators 31. The rails 27 form a path for the wheels 32 of a carriage 33 which is connected fixedly with the movable part of the drive 28. The top side of the carriage 33 serves for receiving the knife changing magazine 25.

The knife changing magazine 25 has a plurality of axial knife receptacles 45 which can be moved by means of the drive 28 into a position axially aligned with the knife receptacles 40 of the knife carriers 18. Further details of the knife changing magazine 25 are described in connection with FIGS. 19 and 20.

Figure 2:
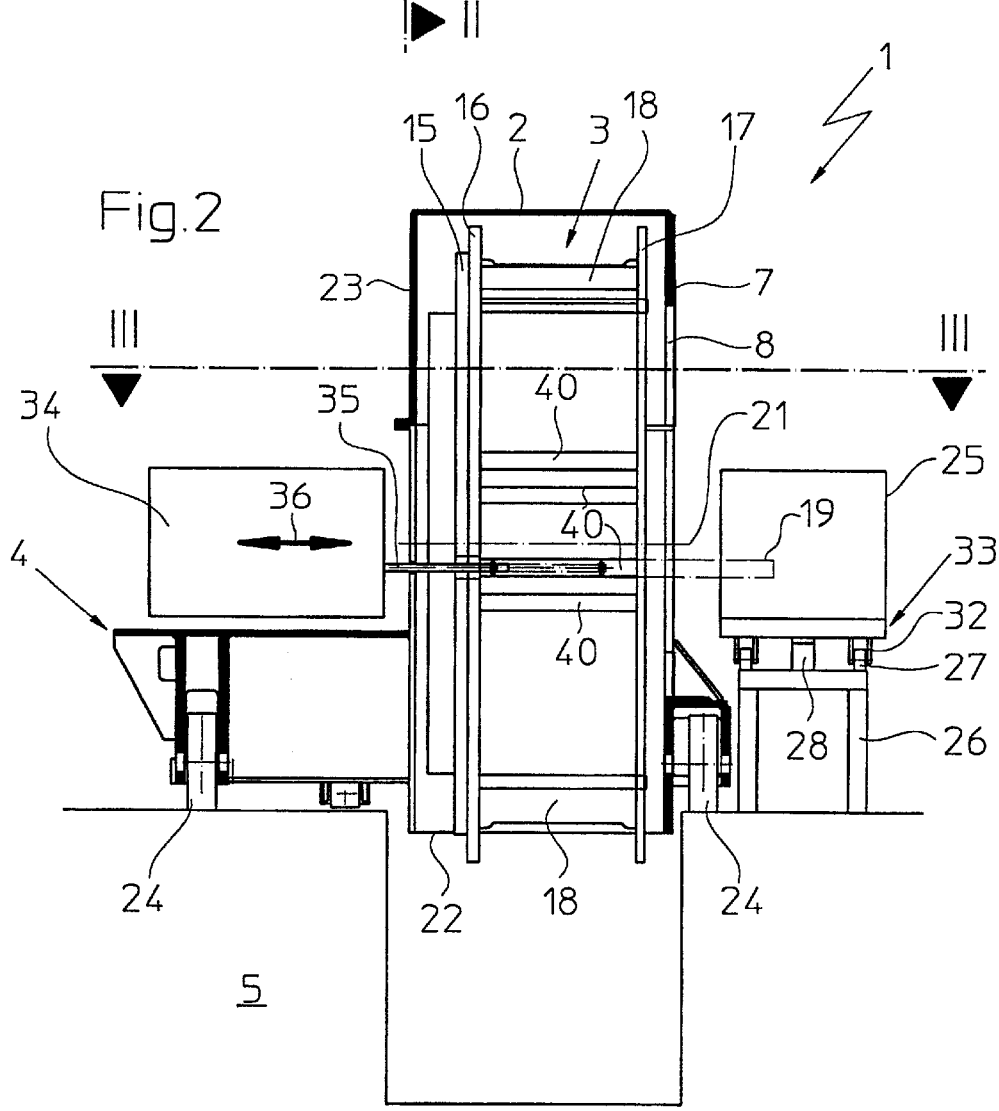
FIG. 2 shows a cross-section along the section line II-II of the knife ring slicing device with knife changing unit as illustrated in FIG. 1.

In the area of the back wall 23 of the housing 2, a section of the annular disc 16 is arranged axially opposed thereto and a knife changing unit 34 is arranged approximately at the level of the axis of rotation 21 and fixedly attached to the base frame 4 of the machine. The knife changing unit 34 houses several pushing elements 35 of which only one, representative of all the others, is illustrated in FIG. 2. The pushing elements 35 are supported axially movably in the knife changing unit 34, and, as illustrated by arrow 36, can be pushed in the axial direction out of the knife changing unit 34 and can be introduced through openings in the back wall 23, the support disc 15, and the annular disc 16 into the knife receptacles 40 of the knife carriers 18. In this way, the knife unit 19 positioned within the knife receptacles 40 is pushed out of the knife ring 3 and is moved into a knife receptacle 45 (FIG. 20) within the knife changing magazine 25.

Different embodiments of the knife changing unit 34 described in connection with FIGS. 1 through 3 are illustrated in FIGS. 4 through 7. The knife ring slicing device 1 corresponds to the knife ring slicing device 1 illustrated in FIGS. 1 through 3 so that the reference numerals used therein are also employed in FIGS. 4 to 7. In contrast to the knife ring slicing device illustrated in FIGS. 1 through 3, the embodiment illustrated in FIGS. 4 through 7 of the invention has no knife changing magazine at the front side 7 of the knife ring slicing device 1 and is suitable therefore particularly for performing a semi-automatic method for changing the knife units 19 in which individual knife units 19 or groups of knife units 19 are pushed only partially out of the knife receptacles 40 of the knife ring 3 and are then completely removed by hand and replaced by knife units 19' which have been resharpened.

By combining or supplementing such a semi-automatic embodiment of the invention with a knife changing magazine 25 and an insertion unit, a completely automated arrangement for changing the knife units 19 of the knife ring 3 results.

The knife changing unit 34 illustrated in FIG. 4 is comprised of a frame which is formed by an inner rectangular plate 48 and an opposed rectangular plate 49 positioned at a spacing thereto. Both plates 48 and 49 are connected fixedly with the base frame 4 of the machine; the plate 48 is additionally connected with the back wall 23 of the machine housing 2. The two plates 48 and 49 are connected with one another by guide elements arranged on each corner, respectively. Moreover, the plates 48 and 49 provide a central rotary bearing for a spindle 51 extending between the plates 48 and 49. The spindle 51 is driven at its end by a drive 52.

Slidable guide bushings 53 are provided on the guide elements 50 and are connected to one another by a transverse beam 54 arranged parallel to the plates 48 and 49. At the center of the transverse beam 54 a spindle nut 55 is fastened which is seated on the spindle 51. Moreover, pushing elements 35 are arranged axis-parallel to the spindle 51 on the transverse beam 54 and are moveably supported with their free ends in bores in the plate 48.

By rotation of the spindle 51, the spindle nut 55 and together with it the transverse beam 54 are moved toward or away from the knife ring 3, depending on the rotational direction, as illustrated by the double arrow. In this way, the pushing elements 35 can be introduced via corresponding bores in the back wall 23 of the housing 2 and in the support disc 15 as well as the annular disc 16 into the knife receptacles 40 within the knife ring 3. Here they impact on the knife units 19 and move them in the axial direction at the front side of the knife ring 3 out of the knife receptacle 40. This state of the knife units 19 is illustrated in dashed lines in FIGS. 4 through 6.

A slight variation of the embodiment illustrated in FIG. 4 is shown in FIG. 6 so that for same parts the same reference numerals are used.

Instead of a central spindle, two parallel spindles 56 and 57 are used which are arranged between the pushing elements 35 and which are driven in the way described above for movement of the transverse beam 54 by means of a synchronizing drive. In this way, the transverse beam 54 glides along the outer guide elements 50.

A further embodiment of the knife changing unit 34, as illustrated in FIG. 5, has two outwardly positioned spindles 58 and 59, which form, in addition to the centrally arranged guide element 60, also a guide for the transverse beam 54. Pushing out or inserting the pushing elements 35 is also realized by synchronously driving the spindles 58 and 59.

The knife changing unit 34 illustrated in FIG. 7 provides a simplification of the knife changing unit 34 illustrated in FIG. 4. In this embodiment, the externally positioned guide elements for the transverse beam 54 are eliminated. Instead, a spindle 61 arranged axis-parallel to the axis of rotation 21 is fastened on two bearing plates 62 and 63. The lower pushing elements 35 are moveably supported in two bores of the bearing plate 63 positioned opposite the housing 2, and, in this way, rotation of the transverse beam 54 and of the pushing elements 35 is prevented. In this embodiment of the invention, the spindle 61 provides the advancing function as well as the guiding function.

Figure 8:
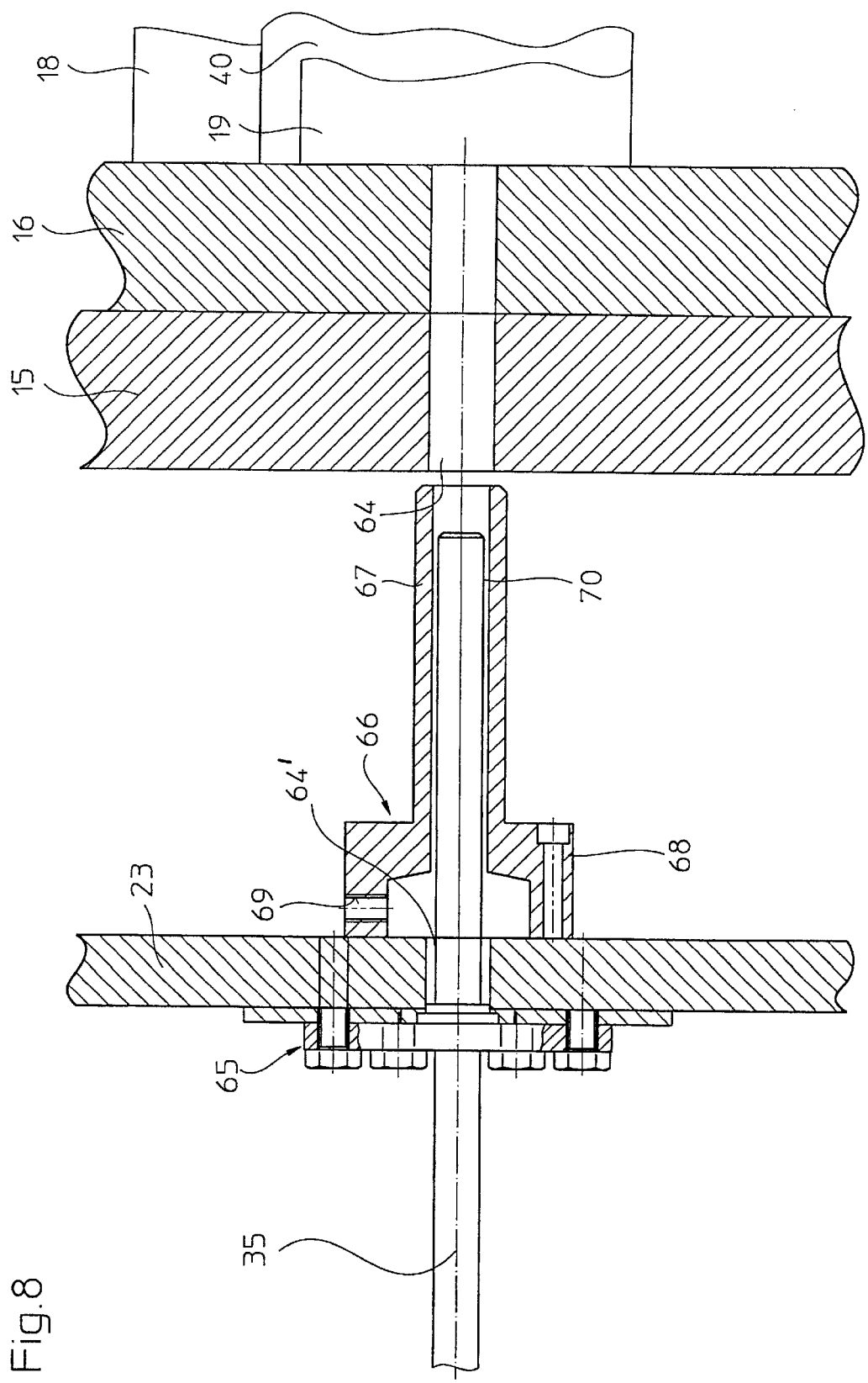
FIG. 8 shows a partial cross-sectional view of a knife changing unit with integrated cleaning device in detail.

FIG. 8 shows a partial cross-section of the area in which the pushing elements 35 penetrate the knife ring slicing device 1. A section of the back wall 23 of the housing 2 is shown as well as a section of the support disc 15 arranged at a spacing thereto and fixedly connected with the annular disc 16. At the inner side of the annular disc 16, the end of a blade unit 19 at the end face is illustrated which is introduced into a knife receptacle 40 of a blade carrier 18 (not illustrated in detail) and rests with its end face against the lateral surface of the annular disc 16. The support disc 15 and the annular disc 16 as well as the back wall 23 of the housing 2 have an aligned bore 64, 64' which extend directly to the end face of the knife unit 19.

Extending from the left edge of the sheet, the forward end of a pushing element 35 is illustrated which has already penetrated the back wall 23 of the housing 2 and whose tip is in a position immediately before penetration of the bore 64 of the support disc 15. Upon further insertion of the pushing element 35, its tip reaches the end face of the knife unit 19 and forces it out of the knife receptacle 40 since the pushing element 35 continues to be driven.

In addition, a cleaning device for cleaning the knife receptacle 40 in the knife carrier 18 during the process of pushing out the knife unit 19 is illustrated in FIG. 8. A sealing element 65 is screwed onto the left side, in the plane of the illustration, of the back wall 23 and provides a seal-tight enclosure of the pushing element 35 even during the advancing movement. On the opposite side of the back wall 23 of the housing 2 a nozzle 66 is arranged whose hollow-cylindrical end 67 projects to the bore 64 in the support disc 15. The nozzle base 68 is widened for forming a chamber and has a penetration 69 for loading the nozzle 66 with a fluid flow. The cleaning nozzle 66 surrounds with its hollow-cylindrical portion 67 the pushing element 35 with a minimal annular gap 70 being provided between the portion 67 and the pushing element 35. When loading the nozzle 66 with a fluid under pressure, a fluid flow results in the annular gap 70 and extends further along the mantle surface of the pushing element 35. In this way, a cleaning action of the knife receptacles 40 during knife exchange takes place with the insertion of the pushing element 35 into the knife receptacles 40.

According to one embodiment of the invention, the knife changing unit 34 is of a unitary configuration, i.e., the knife units 19 are moved out of the knife receptacles 40 of the knife ring 3 from one side of the knife ring, and the insertion of the resharpened knife units 19' from the knife changing magazine 25 into the receptacles 40 of the knife ring 3 is carried out also from the same side (FIGS. 2 and 3 and FIGS. 22 and 23).

In these situations, it is required to provide a pulling-resistant connection between the pushing elements 35 and the knife units positioned in the knife receptacles of the knife changing magazine 25. Different solutions are illustrated in FIGS. 9 through 15 with which a pulling-resistant and pushing-stable connection between the pushing element 35 and the blade unit 19, 19' can be provided.

In FIGS. 9 through 15 the leading end of a pushing element 35 is illustrated onto which a coupling head 71 is positioned, respectively. FIG. 9 shows the coupling head 71 comprised of a truncated cone portion which is introduced into a matching truncated cone-shaped receptacle in the end face of the knife unit 19, 19'. As a result of the slant of the lateral surfaces of less than 2° relative to the mantle surface of the pushing element 35, a frictional connection results which is loadable with regard to pressure as well as tension. Releasing this connection is realized by contacting a surface 72. This causes the clamping force produced by the frictional connection to be overcome so that the truncated cone and thus the pushing element 35 come free.

In an alternative connecting possibility (FIG. 10), the coupling head 71 has one or several radial bores 73 into which a pressure spring 47 is introduced and on which, in turn, a ball 75 is seated as a locking element. The opening of the bore 73 is slightly narrowed so that the ball 75 is captive in the bore.

In the end face of the knife element 19, 19' a cylindrical recess is provided which has at its inner side an annular groove 76. Upon insertion of the pushing element 35 into the recess of the knife element 19, 19', first the ball 75 is radially pushed against the spring force and subsequently snaps into place in the annular groove 76 of the knife unit 19, 19' upon further insertion of the pushing element 35.

The coupling head 71 of FIGS. 11 and 12 is provided with a solenoid or permanent magnet 78. The magnet or solenoid can be connected directly with the smooth end face of a knife unit 19, 19' (FIG. 11) or can be introduced into a recess, matching the solenoid or magnet shape, in the end face of the knife unit 19, 19' (FIG. 12).

The solution illustrated in FIG. 13 shows the knife unit 19, 19' having a cylindrical recess 79 on whose inner side the spring elements 80, already described in connection with FIG. 10, are arranged in a common radial plane. These spring elements 80 snap into place with their ball-shaped latch in an annular groove 93 in the coupling head 71 of the pushing element 35.

In the connection illustrated in FIG. 14 between the pushing element and the knife unit 19, 19' a nonpositive connection by means of positive fit is obtained. For this purpose, the coupling head 71 has a groove 82 into which a projection 83 of the knife unit 19, 19' engages. For producing the positive fit connection, the coupling head 71 is introduced perpendicularly to the plane of illustration into the recess in the knife unit 19, 19' or is rotated about its longitudinal axis.

A further possibility of providing a pull-resistant connection between the pushing element 35 and the knife unit 19, 19' is described in connection with FIGS. 15a and 15b. The knife unit 19, 19' illustrated therein has at its end face a cylindrical recess in whose mantle surface an annular groove 84 is provided. The coupling head 71 has a ball 86 which is moveably arranged within a radial guide and serves as a latch; it cooperates with the annular groove 84 of the knife unit 19, 19'. For actuating the ball 86, an axially movable control element 87 is provided within the coupling head 71. It can be separately controlled and has two glide surfaces 81 and 85 for the ball 86 which are positioned at different levels relative to one another and connected by a ramp. A pressure spring 88 acts between the end of the coupling head 71 and the end of the control element 87 at the end face.

By coaxial movement of the control element 87 counter to the spring force of the coil spring 88, the ball 86 is pushed radially outwardly by the glide surface 81 via the ramp and the glide surface 85 and snaps into place in the annular groove 84 of the knife unit 19, 19'. A release of the locking action is realized in the reverse order so that by axial movement of the control element 87 in the direction of the spring force a lowering of the ball 86 onto the lower glide surface 81 of the control element 87 is possible and the annular groove 84 is released in this way.

FIGS. 16 and 17 show an alternative or additionally embodiment of the cleaning device relative to FIG. 8 for the knife receptacles 40 in the knife ring 3. The pushing element 35 is illustrated which is in the form of a hollow cylinder and which is moved into a nonpositive connection with a knife unit 19 by means of the coupling head 71 described in connection with FIGS. 9 through 15. In the vicinity of the coupling head 71 radially acting cleaning nozzles 90 are arranged. They are connected via the hollow cylinder of the pushing element 35 to the cleaning system which ensures the exit of a cleaning fluid and/or a gas, for example, air, out of the nozzles 90 at high pressure.

FIG. 17 shows also a part of the knife carrier 18 in the area of the knife receptacle 40. In the dashed illustration a part of the knife unit 19 is shown in a position in which it is arranged in the knife receptacle 40 during the pushing out movement. Moreover, FIG. 18 shows the bore in the annular disc 26, which bore is identified by reference numeral 64 in FIG. 8. The pushing element 35 reaches the knife receptacles 40 in the knife carrier 18 via the bore 64.

FIGS. 18 and 19 show details of the configuration of the knife changing magazine 25 including the adjusting device 95 for horizontal adjustment of the knife changing magazine 25 into the knife changing position.

The knife changing magazine 25 is comprised substantially of the lateral parts 96 and 97 which are arranged parallel and at a spacing to one another. The lateral parts 96 and 97 are connected rigidly by means of bolts 98 provided at the corners. The lateral parts 96 and 97 have a plurality of slot-shaped recesses 99. The recesses 99 are arranged above one another and form groups wherein the individual groups are arranged on parallel circular arc sections. The number of recesses 99 of a circular arc section corresponds to the number of pushing elements 35 of the knife changing unit 34 and thus to the number of knife units 19 which can be changed simultaneously by a single exchange operation. The slants of the recesses 99 of a circular arc section changes from recess 99 to recess 99 and correspond exactly to the slant of the knife units 19 mounted in the knife ring 3. The recesses 99 in the lateral part 96 are arranged congruently with the recesses 99 in the lateral part 97.

Between two oppositely positioned recesses 99 of the lateral parts 96 and 97, angle elements 100 and 101 (FIG. 20) connecting the recesses 99, respectively, are inserted whose legs form gliding and stop surfaces for the knife unit 19, 19'. In this way, the angle elements 100 and 101 as well as the lateral parts 96 and 97 including the recesses 99 provide a plurality of knife receptacles 45 in the knife changing magazine 35 into which the knife units 19, 19' can pushed or from which they can be removed.

For the knife exchange method according to the invention, the total number of knife receptacles 45 is based on the number of knife units 19 to be exchanged plus the number of knife receptacles 45 required for the number of knife units 19 of a group to be simultaneously exchanged. Because of this, in FIGS. 18 and 19 additional knife receptacles 45 of a circular section are without resharpened knife units 19' while the other knife receptacles 45 are provided with resharpened knife units 19'.

Such a knife changing magazine 25 is moved by means of the adjusting device 95 into the suitable knife changing position. The adjusting device 95 has a carriage 33 which can be linearly moved on a stationary substructure 26 as indicated by the arrow 102. A centering bolt 119 projects from the plane top side of the carriage 33 and matches a recess in the underside of the knife changing magazine 25. The carriage 33 is driven by a drive 28 which is, for example, a spindle drive, a toothed rack drive, a chain drive or the like.

The adjusting device 95 also includes a travel measuring system 29 which is comprised of a strip stationarily arranged relative to the substructure 26 and provided with initiators 31. The initiators 31 cooperate with index bolts 30 provided on the carriage 33.

For the knife exchange operation a knife changing magazine 25 furnished with resharpened knife units 19' is placed by means of a crane 103 onto the carriage 33, wherein a centering of the knife changing magazine 25 relative to the carriage 33 is realized by means of the centering bolt 119.

The stationary substructure 26 and the travel measuring system 29 form a stationary unit relative to the knife ring slicing device 1 so that, by means of the height of the substructure 26 and the position of the carriage 33, determined by the travel measuring system 29, a precise positioning of the knife changing magazine 25 relative to the knife ring slicing device 1 can be realized.

FIG. 21 shows an alternative embodiment of a knife changing magazine 25. It is comprised of two opposed coaxially positioned, spaced apart rings of which in FIG. 21 only one is illustrated and identified with reference numeral 104. The two rings have recesses wherein oppositely arranged recesses are connected with one another in the axial direction by means of gliding and guiding elements so that in this way axial knife receptacles are formed in the knife changing magazine 25. The arrangement of the knife receptacles corresponds exactly to the arrangement of the knife units 19 in the knife ring 3 of the knife ring slicing device 1. Also shown are contact surfaces 105 uniformly distributed about the outer circumference.

The carriage 33 has at its top side two axial, freely rotatable rollers 106 and 107 which are provided for supporting and simultaneously centering the knife changing magazine 25. Moreover, a cylinder/piston unit 108 is connected to the top side of the carriage 33 whose movable piston upon being extended impacts on a contact surface 105 and in this way causes the knife changing magazine 25 to be rotated in order to bring a neighboring ring section into the knife changing position.

Figure 22:
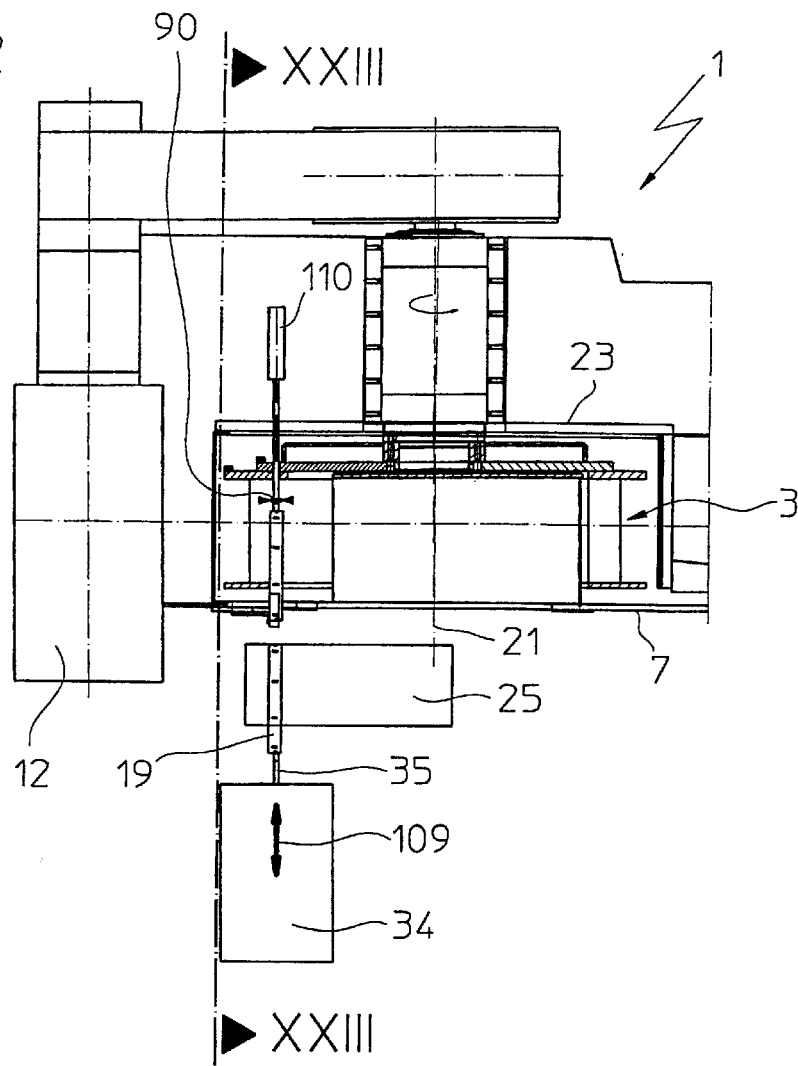
FIG. 22 shows a further arrangement of a knife changing unit on a knife ring slicing device in a plan view.
Figure 23:
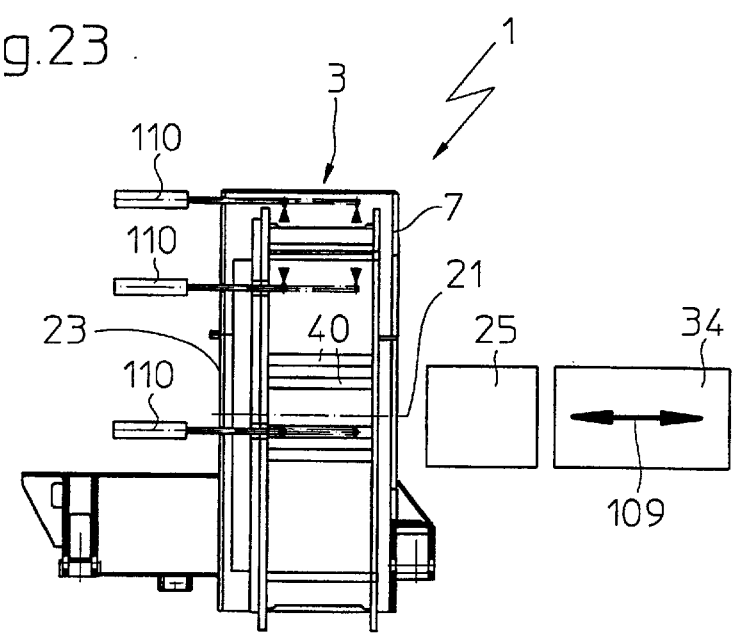
FIG. 23 shows a cross-section along the line XXIII-XXIII of FIG. 22.

FIG. 22 and FIG. 23 show an alternative embodiment of the invention. The illustrated knife ring slicing device 1 corresponds to that illustrated in FIGS. 1 through 3 so that identical reference numerals are used and reference is being had to the corresponding description. Differences reside only in the arrangement of the knife changing unit 34 which in FIGS. 22 and 23 is arranged at the front side 7 with intermediate positioning of the knife changing magazine 25 instead of opposite the back wall 23 of the knife ring slicing device 1. The knife changing unit 34 illustrated in FIGS. 22 and 23 has also pushing elements 35 which can be brought into a pull-resistant and push-resistant connection with the knife units 19, 19' so that the knife units 19, 19' can be pushed as well as pulled by the knife changing unit 34 which is illustrated by arrow 109. The knife exchange is carried out in this embodiment only from one side of the knife ring 3.

Since in this variant the pushing elements 35 of the knife changing unit 34 no longer are introduced into the knife receptacles 40 in the knife ring 3, cleaning of the knife receptacles 40 by means of the pushing elements 35 is no longer possible. For this reason, special cleaning elements 110 are arranged at the back wall 23 of the knife ring slicing device 1 which can be guided in the axial direction through the back wall 23 into the interior of the machine housing 2. The cleaning elements 110 are provided with several cleaning nozzles with which a cleaning liquid and/or a gas, for example, air, can be supplied at high pressure into the knife receptacles from the inner side as well as the outer side of the knife carriers onto the knife ring 3.

Figure 24:
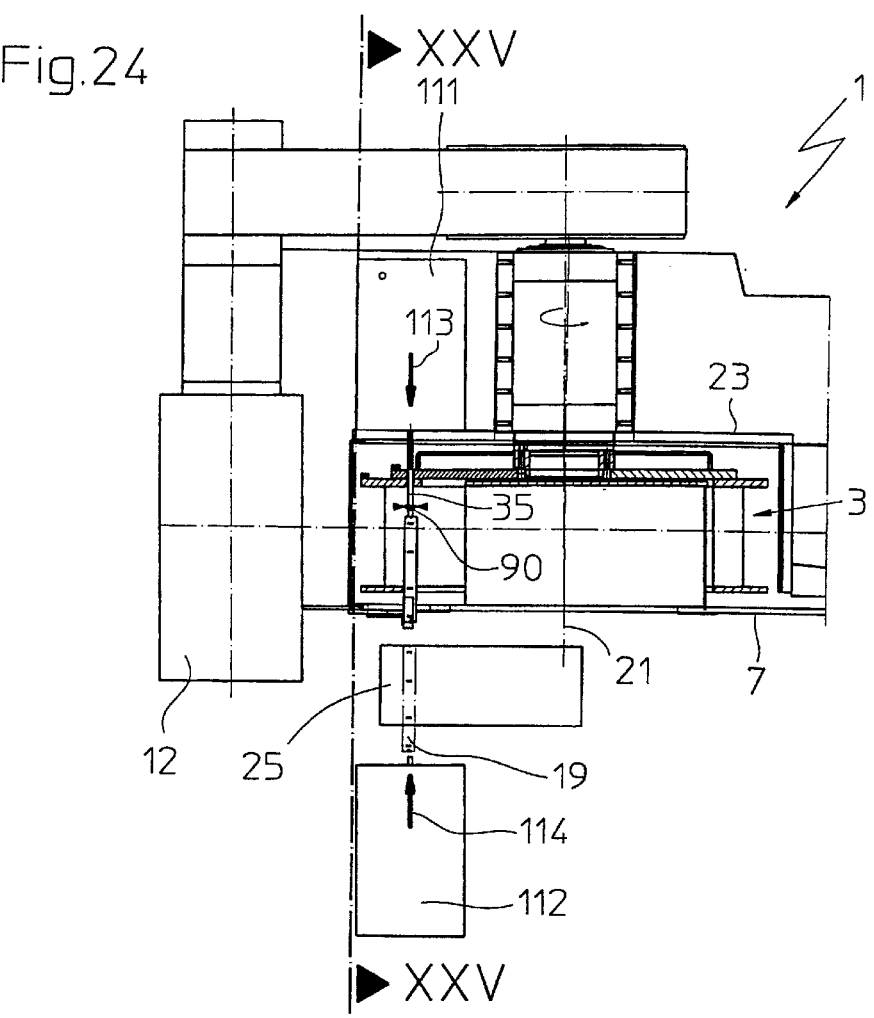
FIG. 24 shows a further arrangement of a knife changing unit on a knife ring slicing device in a plan view.
Figure 25:
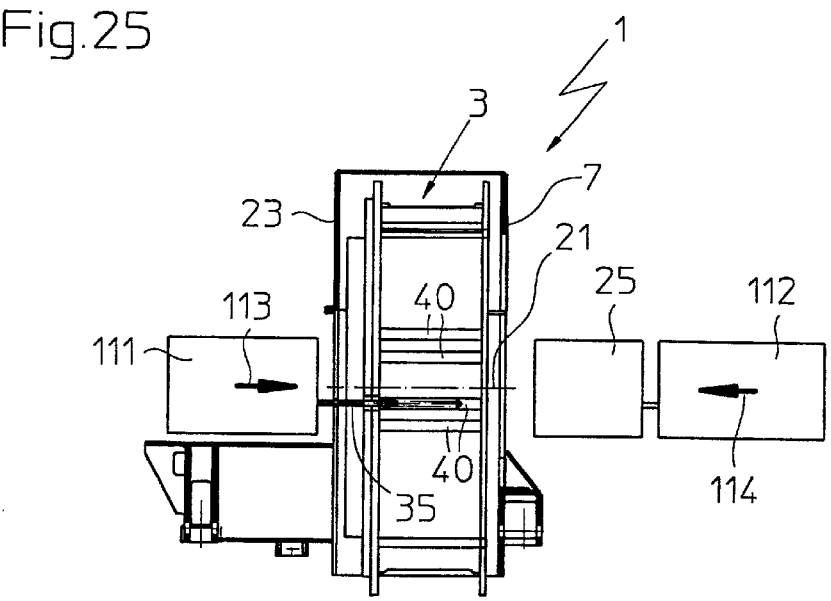
FIG. 25 shows a cross-section along the line XXV-XXV of FIG. 24.

FIGS. 24 and 25 show further embodiments of the invention wherein, as a result of the identical configuration of the knife ring slicing device 1, the same reference numerals as in FIGS. 1 through 3 are employed and reference is being had to the corresponding part of the description.

The knife changing unit illustrated in FIGS. 24 and 25 is divided into two spatially separate units. On the back wall 23 of the knife ring slicing device 1 the pushing unit 111 is arranged which carries out only the pushing movement for moving the knife units 19 out of the knife ring 3 into the knife changing magazine 25. On the opposite side behind the knife changing magazine 25 the insertion unit 112 is arranged which realizes the pushing movement for moving the resharpened knife units 19' out of the knife changing magazine 25 into the empty knife receptacles 40 in the knife ring 3. The arrows 113 and 114 show in which direction the pushing unit 111 or the insertion unit 112 acts.

In this variant it is possible to integrate cleaning nozzles 90 into the pushing elements 35 of the pushing unit 111 so that the pushing-out movement for moving the knife units 19 out of the knife ring 3 can realize at the same time a cleaning of the knife receptacles 40.

FIGS. 26 through 31 show different operating states of the invention when performing a knife exchange. By means of FIGS. 26 to 31 the method according to the invention will be explained in the following in more detail by means of a two-part knife exchange unit comprised of a pushing unit 111 and an insertion unit 112. The individual method steps are triggered by a programmable automatic sequence control which receives all of the data provided by the sensors and processes them and calculates based thereon control commands which are then sent to the knife ring slicing unit 1 and the components necessary for the knife exchange.

Figure 26:
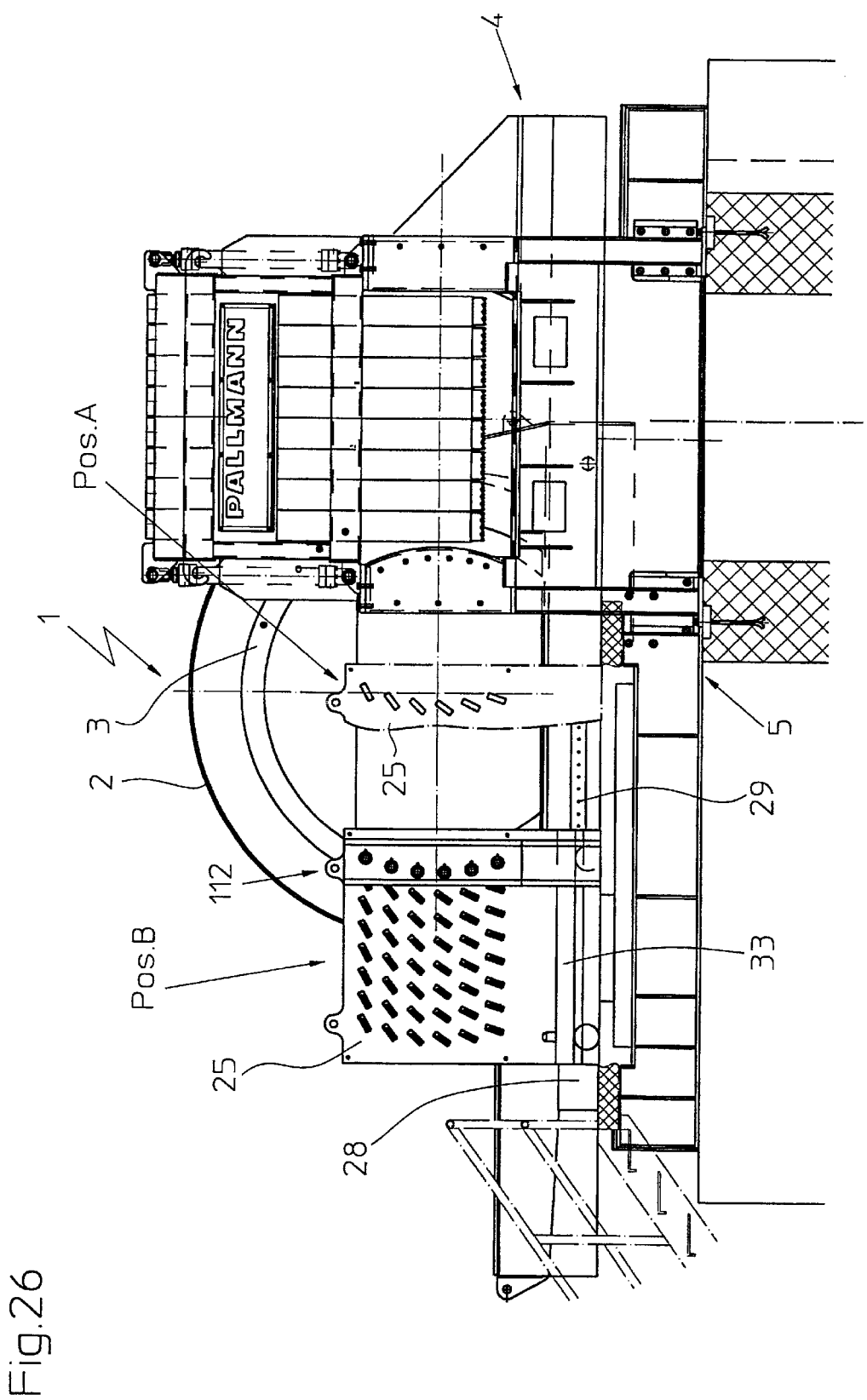
FIG. 26 shows a knife ring slicing device with knife changing unit in a first operating state during the knife exchange.
Figure 27:
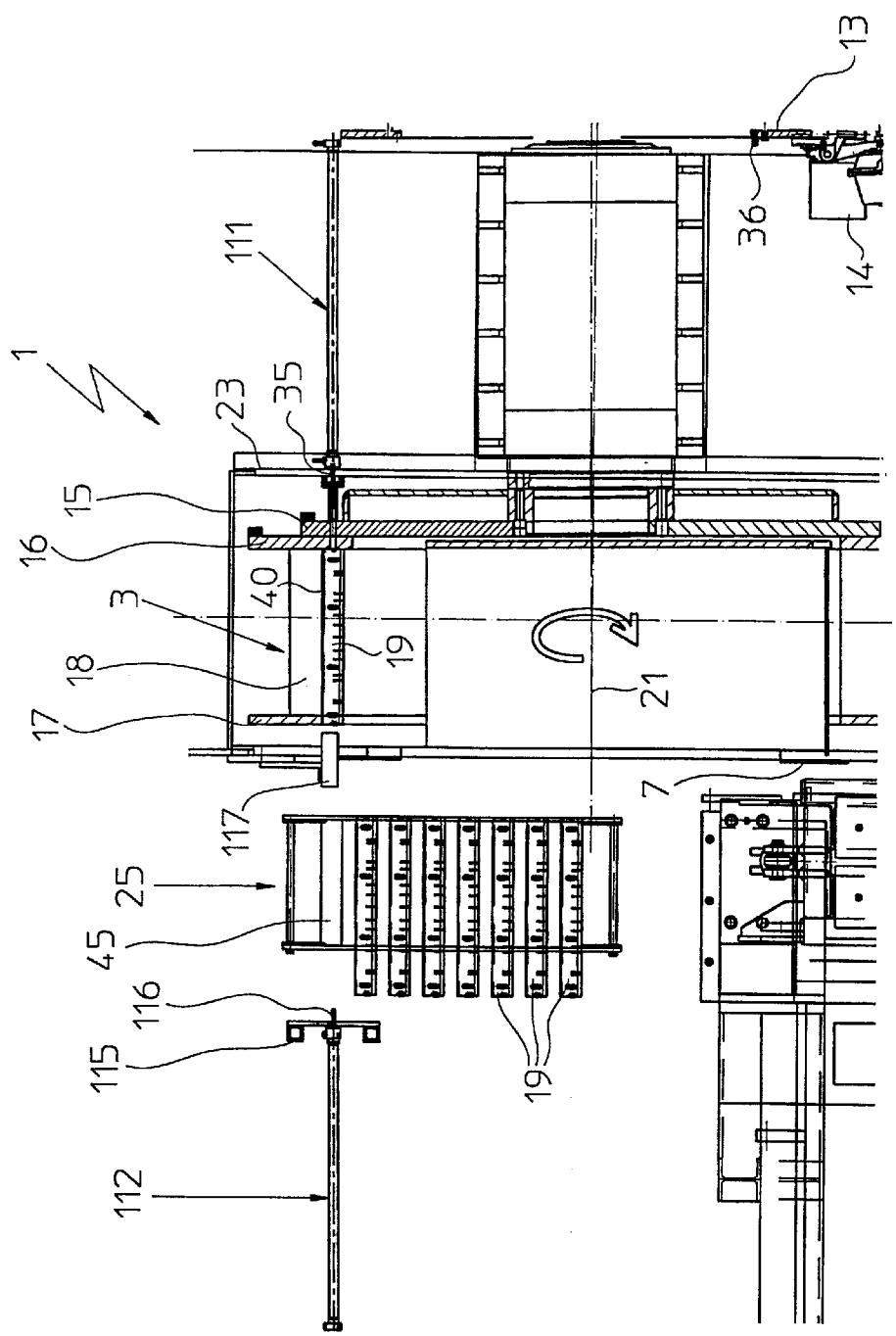
FIG. 27 shows the knife ring slicing device with knife changing unit of FIG. 26 in a second operating state during the knife exchange.

FIGS. 26 and 27 show the initial position of a knife ring slicing device 1 with the pushing unit 111, the insertion unit 112, as well as the knife changing magazine 25 in the position A. In the initial position for the knife exchange the knife ring 3 has been moved into a knife changing position. This is realized by a slow rotation of the knife ring 3 by the drive 6 until the braking and indexing disc 13 in connection with the initiator 36 and the disc brake 14 stops the knife ring 3 in a position in which the knife receptacles 40 in the knife ring 3 are axially aligned with the pushing elements 35 of the pushing unit 111 (see also FIG. 3). The knife pushing unit 111 is comprised in the present embodiment of several cylinder/piston units arranged in a circular arc pattern and fastened on the back wall 23 of the knife ring slicing device 1. Their movable pistons form the pushing elements 35. In the initial position the pushing elements 35 are retracted into the cylinders.

The knife changing magazine 25 corresponds to that described in FIGS. 18 to 20. The knife changing magazine 25 is furnished with the same number of resharpened knife units 19' as are present within the knife ring 3. The resharpened knife units 19' are grouped in the knife changing magazine 25 in adjacently positioned circular arc sections. In addition, the knife changing magazine 25 has empty knife receptacles 45 which correspond to the number of knife units 19 of a circular arc section.

The knife changing magazine 25 is deposited onto the carriage 33 and by means of the drive 28 and the travel measuring system 29 is moved into the knife changing position where the empty knife receptacles 45 of the knife changing magazine 25 are axially aligned with the knife receptacles 40 in the knife ring 3 and the pushing elements 35 of the pushing unit 111.

The insertion unit 112 arranged behind the knife changing magazine 25 has, in principle, the same configuration as the pushing unit 111. The insertion unit 112 is fastened on a column 115 fixedly connected to the substructure 5 of the machine wherein the insertion elements 116 are retracted into the cylinders.

Figure 28:
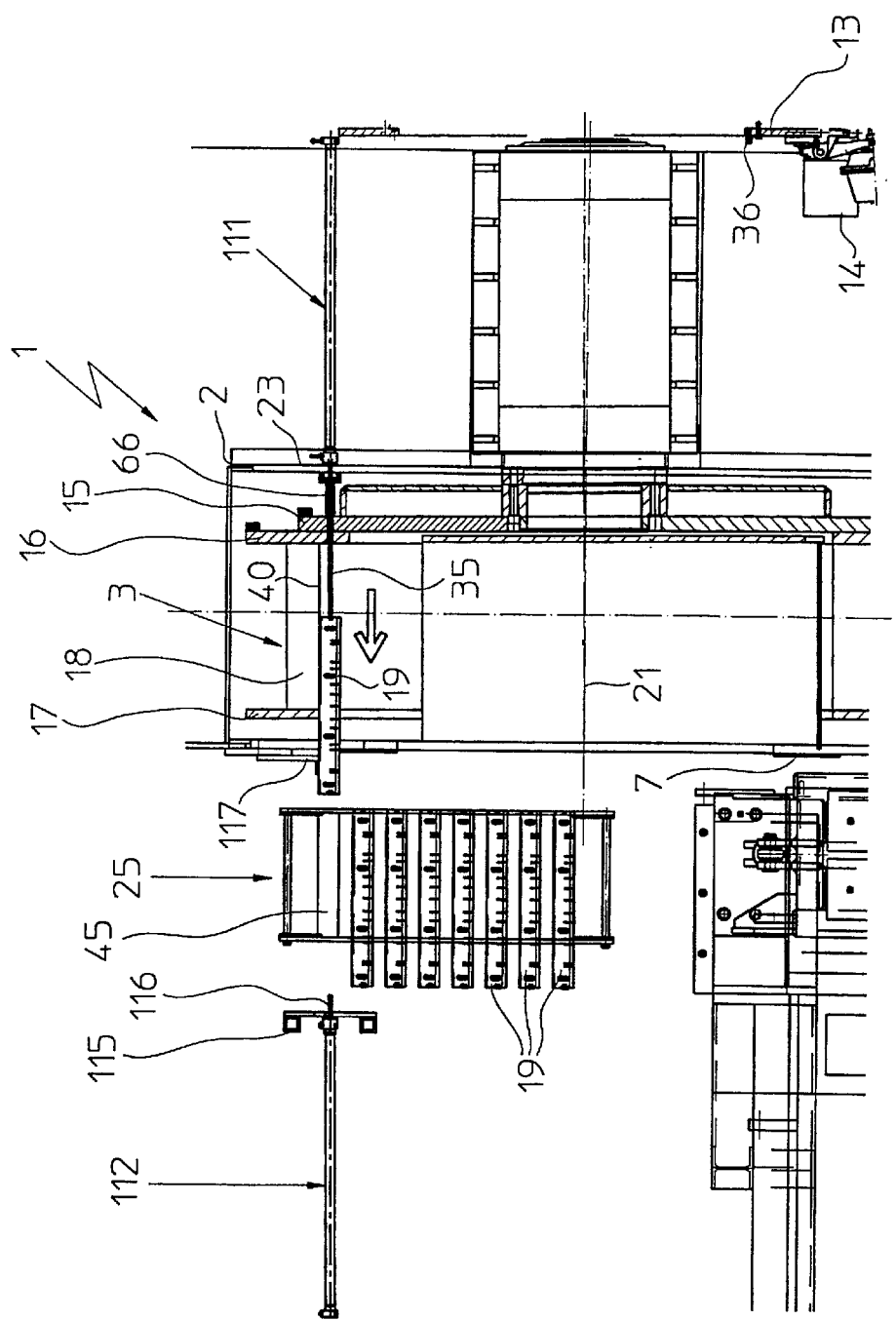
FIG. 28 shows the knife ring slicing device with knife changing unit of FIG. 26 in a third operating state during the knife exchange.

FIG. 28 shows the next method step in which the programmable automatic sequence control telescopes the pushing elements 35 out of the pushing unit 111 wherein they are moved through the openings in the back wall 23 of the knife ring slicing device 1 and openings in the support disc 15 and the annular disc 16 into the knife receptacles 40 in the knife ring 3. Here, the pushing elements 35 impact on the end face of the knife units 19 previously detached from the fastening means of the knife carriers 18 and push them in the axial direction out of the knife ring 3 in the direction of the free receptacles 45 in the knife changing magazine 25. In order to bridge the spacing between the knife ring 3 and the knife changing magazine 25, at the front side 7 of the housing 2 guide elements 117 (FIG. 27) are arranged which align the knife units 19 precisely with the free knife receptacles 45 of the knife changing magazine 25. The worn knife units 19 are pushed by the pushing elements 35 to such an extent until they are received completely by the knife changing magazine 25. Subsequently, the pushing elements 35 are retracted into their initial position.

Already during the pushing movement of the pushing elements 35 and optionally also during the return movement the knife receptacles 40 in the knife ring 3 are cleaned by cleaning nozzles 66 (FIG. 8) and optionally by further cleaning nozzles in the head area of the pushing elements (FIGS. 16 and 17) with a water/air mixture at high pressure.

Figure 29:
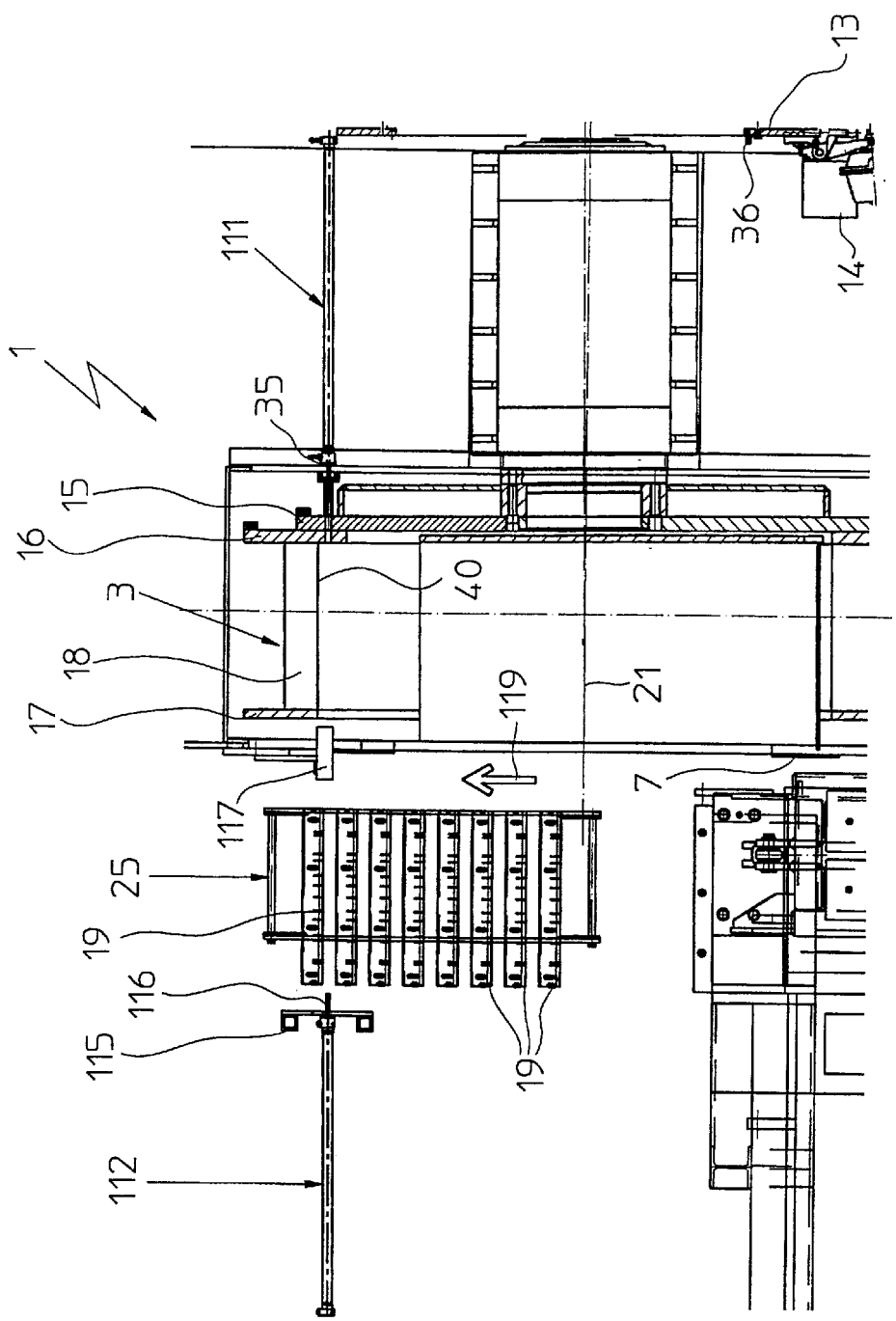
FIG. 29 shows the knife ring slicing device with knife changing unit of FIG. 26 in a fourth operating state during the knife exchange.

In the next step, as illustrated in FIG. 29 by the arrow 119, the knife changing magazine 25 is moved to the side by one cycle. Now the first circular arc section with the resharpened knife units 19' is in the knife changing position and aligned with the empty and cleaned knife receptacles 40 in the knife ring 3. The amount by which the knife changing magazine 25 must be laterally moved is determined by the travel measuring system 29 and this information is supplied to the programmable automatic sequence control which controls the advancement of the carriage 33 accordingly.

Figure 30:
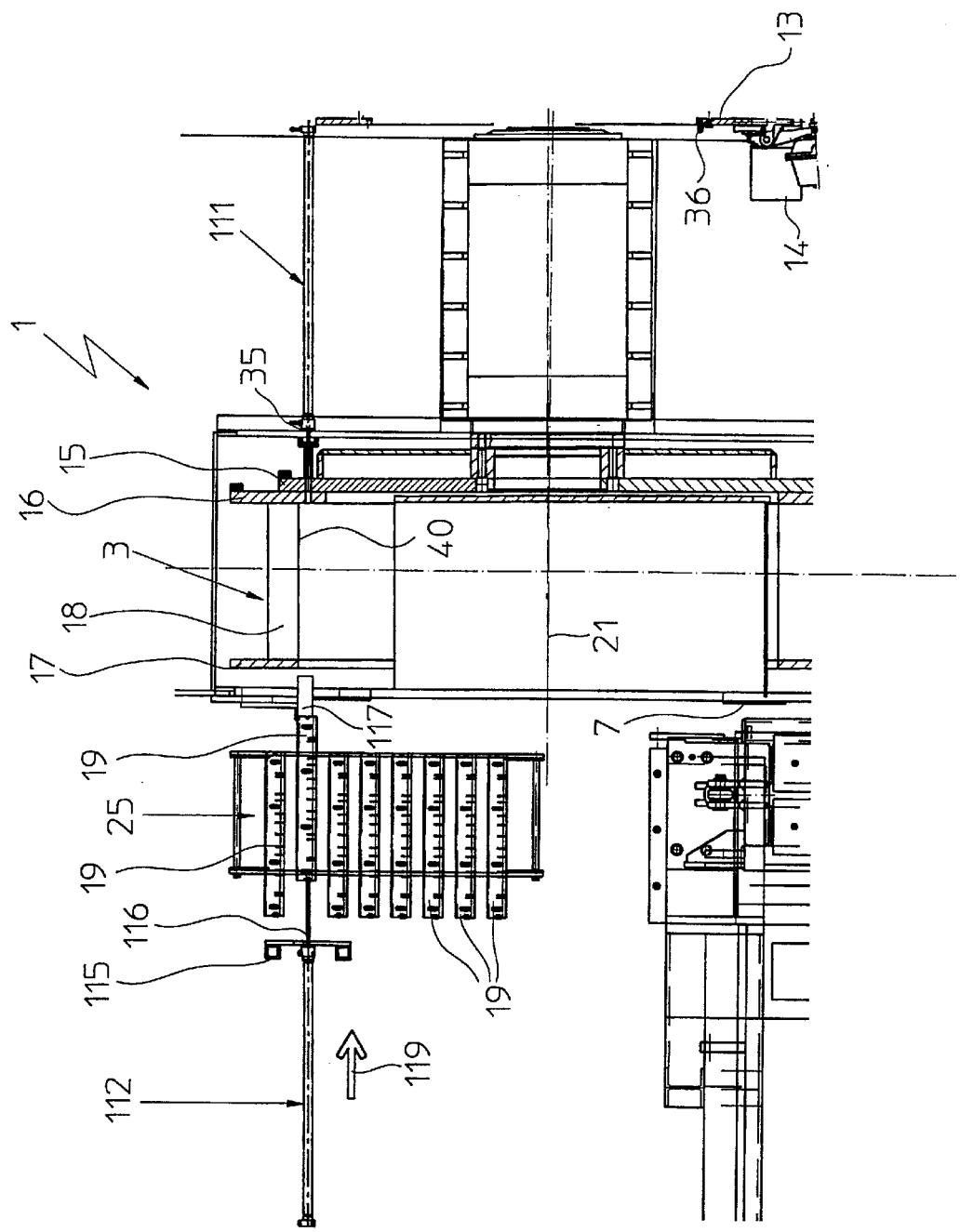
FIG. 30 shows the knife ring slicing device with knife changing unit of FIG. 26 in a fifth operating state during the knife exchange.

FIG. 30 shows the next method step in which the insertion elements 116 of the insertion unit 112 are advanced in the direction of arrow 119 wherein they impact on the end face of the resharpened knife units 19', positioned in the knife changing magazine 25, and move the knife units 19' via the guide elements 117 into the free and cleaned knife receptacles 40 in the knife ring 3 until the knife units 19' contact with the oppositely positioned end face the annular disc 16. Subsequently, the insertion elements 116 are retracted into their rest position. At the same time, the nominal position of the knife units 19' being inserted momentarily is monitored by means of non-represented sensors being part of a control unit. For example, the sensors can be photo diodes or ultrasound distance measuring devices or infrared distance measuring devices. Only when the control device affirms the nominal position of the blade units 19', the knife units 19' are fastened by generally known fastening devices in the knife ring 3.

Figure 31:
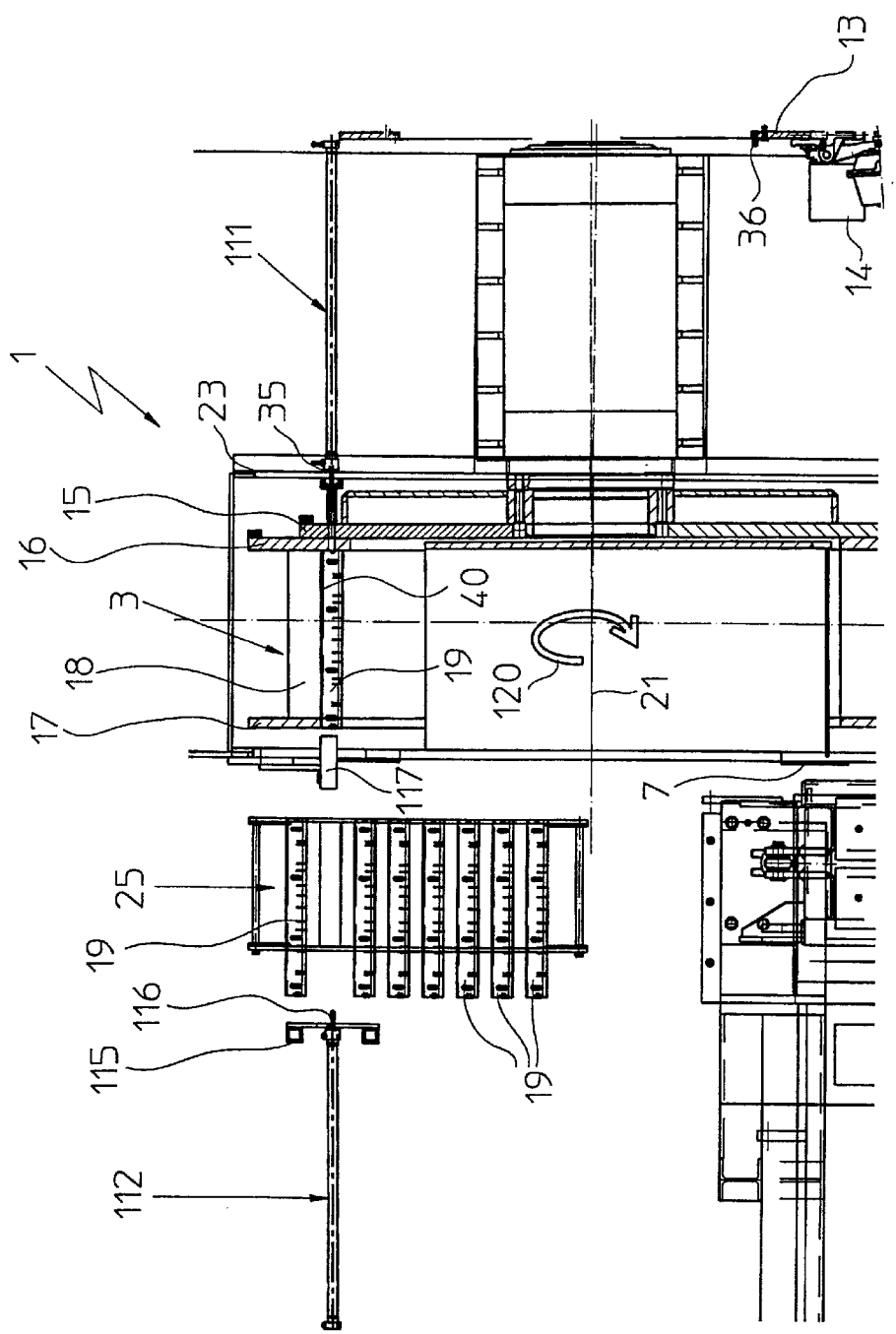
FIG. 31 shows the knife ring slicing device with knife changing unit of FIG. 27 in a sixth operating state during the knife exchange.

The next and last method step of a knife changing cycle is illustrated in FIG. 31 where the arrow 12 shows the rotation of the knife ring 3 about the axis of rotation 21. In this connection, the circular arc section of the knife ring 3 which has just been provided with the resharpened knife units 19' is moved out of the knife changing position wherein at the same time a neighboring circular arc section of the knife ring 3, which contains worn knife units 19, is moved into the knife changing position. The amount of rotation of the knife ring 3 is again determined by the braking and indexing disc 13 and by means of the initiators 136. In this position, the first cycle for exchanging a group of knife units is completed, and a new cycle for exchanging the next group of knife units is carried out according to the already described one in connection with FIG. 27*ff*.

These process steps are continued until all worn knife units 19 of the knife ring 3 have been replaced with the resharpened knife units 19' of the knife changing magazine 25. This situation is illustrated in FIG. 26 by the position B of the knife changing magazine 25. From this position the knife changing magazine 25 containing the spent or worn knife units 19 is removed by means of a crane to a resharpening station.

While specific embodiments of the invention have been shown and described in detail to illustrate the inventive principles, it will be understood that the invention may be embodied otherwise without departing from such principles.

What is claimed is:

1. A method for automatically exchanging knife units of a knife ring of a knife ring slicing device, the method comprising the steps of:
   a) providing a knife ring with first knife receptacles;
   b) providing a knife changing magazine at one side of the knife ring, the knife changing magazine having second knife receptacles;
   c) moving the knife changing magazine at the one side of the knife ring relative to the knife ring into a first knife changing position, wherein in the first knife changing position at least two of the second knife receptacles of the knife changing magazine are axially aligned with at least two of the first knife receptacles of the knife ring;
   d) releasing at least two worn knife units arranged in the first knife receptacles from the knife ring;
   e) moving the at least two knife units in a first axial direction out of the knife ring and thereby pushing the at least two knife units in the first axial direction into empty ones of the second knife receptacles within the knife changing magazine;
   f) carrying out a relative movement between the knife changing magazine and the knife ring, while the knife changing magazine is at the one side of the knife ring, until the knife changing magazine and the knife ring are in a second knife changing position in which the at least two second knife receptacles provided with resharpened knife units are axially aligned with the at least two first knife receptacles in the knife ring from which the knife units have been removed in the step e); and
   g) pushing out the at least two resharpened knife units in a second axial direction opposite the first axial direction from the magazine and and thereby introducing the at least two resharpened knife units in the second axial direction into the at least two first knife receptacles of the knife ring from which the at least two knife units have been removed in the step e).

2. The method according to claim 1, wherein the knife ring is stationary and the knife changing magazine is moveable.

3. The method according to claim 2, wherein the knife changing magazine is moveable in at least one of a horizontal direction and a vertical direction or is rotatable about an axis which is axis-parallel to an axis of rotation of the knife ring.

4. The method according to claim 1, wherein the worn knife units are combined into groups and wherein the groups are sequentially exchanged by repeating the steps c) through g) for the groups, respectively.

5. The method according to claim 4, wherein the groups of the worn knife units are moved by rotation of the knife ring into the first knife changing position.

6. The method according to claim 4, wherein a number of the knife units of each one of the groups corresponds approximately to the number of knife units along a quarter to one sixteenth of a circumferential length of the knife ring.

7. The method according to claim 6, wherein the number of knife units is between six and eight.

8. The method according to claim 1, wherein in the steps e) and g) the knife units are additionally guided.

9. The method according to claim 1, wherein the intervals between the knife exchanges of the knife units of the knife ring are controlled as a function of the energy consumption of the knife ring slicing device.

10. The method according to claim 1, further comprising the step of cleaning the first knife receptacles of the knife ring during at least one of the steps e) and g).

11. The method according to claim 1, further comprising the step of performing a control measurement for monitoring a nominal position of the resharpened knife units after the step g).

12. The method according to claim 1, wherein the steps c) through g) are performed while the knife ring is mounted within the knife ring slicing device or within a resharpening device.

\* \* \* \* \*